(12) United States Patent
Zhao et al.

(10) Patent No.: US 10,366,447 B2
(45) Date of Patent: Jul. 30, 2019

(54) PROVIDING A VIRTUAL SHOPPING ENVIRONMENT FOR AN ITEM

(71) Applicant: eBay Inc., San Jose, CA (US)

(72) Inventors: Lucy Ma Zhao, Austin, TX (US); Kamal Zamer, Austin, TX (US)

(73) Assignee: eBay Inc., San Jose, CA (US)

( * ) Notice: Subject to any disclaimer, the term of this patent is extended or adjusted under 35 U.S.C. 154(b) by 593 days.

(21) Appl. No.: 14/474,116

(22) Filed: Aug. 30, 2014

(65) Prior Publication Data

US 2016/0063613 A1    Mar. 3, 2016

(51) Int. Cl.
*G06Q 30/06*    (2012.01)

(52) U.S. Cl.
CPC ................... *G06Q 30/0643* (2013.01)

(58) Field of Classification Search
CPC ................................... G06Q 30/06–08
USPC ................................ 705/26.1–27.2
See application file for complete search history.

(56) References Cited

U.S. PATENT DOCUMENTS

| | | | |
|---|---|---|---|
| 5,930,769 A | 7/1999 | Rose | |
| 5,937,081 A | 8/1999 | O'Brill et al. | |
| 6,546,309 B1 | 4/2003 | Gazzuolo | |
| 6,968,075 B1 | 11/2005 | Chang | |
| 7,062,454 B1* | 6/2006 | Giannini | G06Q 30/06 705/26.1 |
| 7,194,327 B2 | 3/2007 | Lam | |
| 7,617,016 B2 | 11/2009 | Wannier et al. | |
| 8,256,664 B1 | 9/2012 | Balfanz et al. | |
| 8,401,914 B1 | 3/2013 | Kim | |
| 8,437,871 B2 | 5/2013 | Ko | |
| 8,660,902 B2 | 2/2014 | Coulter | |
| 8,700,392 B1 | 4/2014 | Hart et al. | |
| 8,818,883 B2 | 8/2014 | Lawrence et al. | |
| 8,982,109 B2 | 3/2015 | Vilcovsky et al. | |
| 9,898,742 B2 | 2/2018 | Higgins et al. | |

(Continued)

FOREIGN PATENT DOCUMENTS

| | | |
|---|---|---|
| WO | 2015/200617 A1 | 12/2015 |
| WO | 2016/019033 A2 | 2/2016 |

(Continued)

OTHER PUBLICATIONS https://www.youtube.com/watch?v=F-3qC4q8toU (dated Feb. 15, 2012).*

(Continued)

*Primary Examiner* — Ming Shui
(74) *Attorney, Agent, or Firm* — SBMC

(57) ABSTRACT

Techniques for providing a virtual item shopping environment are presented herein. A dimension module may be configured to determine one or more dimensions of a person near a display. A selection module may be configured to select one or more items from a database based on the determined dimensions. A display module configured to present the one or more items on the display. In other embodiments, the selection module may further be configured to receive a selection from the person via a user interface. The selection may indicate one of the presented items. In another embodiment, the display module may be configured to display a live real-time video of the person wearing the selected item. The live real-time video may include video of the person with an overlaid image of the selected item.

24 Claims, 14 Drawing Sheets

(56) References Cited

U.S. PATENT DOCUMENTS

| | | | |
|---|---|---|---|
| 2002/0045959 A1 | 4/2002 | Van Overveld | |
| 2002/0178061 A1 | 11/2002 | Lam | |
| 2005/0086126 A1 | 4/2005 | Patterson | |
| 2005/0246278 A1 | 11/2005 | Gerber et al. | |
| 2005/0275638 A1 | 12/2005 | Kolmykov-Zotov et al. | |
| 2008/0004116 A1 | 1/2008 | Van Luchene et al. | |
| 2008/0262944 A1 | 10/2008 | Wu | |
| 2009/0018926 A1 | 1/2009 | Buehlman | |
| 2009/0019053 A1 | 1/2009 | Burgess et al. | |
| 2009/0115777 A1 | 5/2009 | Reyers Moreno | |
| 2010/0030578 A1* | 2/2010 | Siddique | G06Q 10/0637 705/3 |
| 2010/0034462 A1 | 2/2010 | Nevatia et al. | |
| 2010/0191770 A1 | 7/2010 | Cho et al. | |
| 2010/0217685 A1 | 8/2010 | Melcher et al. | |
| 2010/0245555 A1 | 9/2010 | Talluri et al. | |
| 2010/0306082 A1 | 12/2010 | Wolper et al. | |
| 2011/0246329 A1 | 10/2011 | Geisner et al. | |
| 2012/0022978 A1 | 1/2012 | Manea et al. | |
| 2012/0086783 A1 | 4/2012 | Sareen | |
| 2012/0137259 A1 | 5/2012 | Campbell et al. | |
| 2012/0239513 A1 | 9/2012 | Oliver et al. | |
| 2012/0257035 A1 | 10/2012 | Larsen | |
| 2012/0299912 A1 | 11/2012 | Kapur et al. | |
| 2013/0030915 A1 | 1/2013 | Statler et al. | |
| 2013/0110679 A1 | 5/2013 | Spadafora et al. | |
| 2013/0166407 A1 | 6/2013 | Sullaj | |
| 2013/0179288 A1 | 7/2013 | Moses et al. | |
| 2013/0185679 A1 | 7/2013 | Fretwell et al. | |
| 2013/0215116 A1 | 8/2013 | Siddique et al. | |
| 2013/0254066 A1 | 9/2013 | Amacker et al. | |
| 2013/0304578 A1 | 11/2013 | Kannan et al. | |
| 2013/0315475 A1 | 11/2013 | Song et al. | |
| 2014/0035913 A1 | 2/2014 | Higgins et al. | |
| 2014/0052567 A1 | 2/2014 | Bhardwaj et al. | |
| 2014/0115059 A1 | 4/2014 | Van Wie et al. | |
| 2014/0168217 A1 | 6/2014 | Kim et al. | |
| 2014/0176565 A1 | 6/2014 | Adeyoola et al. | |
| 2014/0180873 A1 | 6/2014 | Rijhwani | |
| 2014/0225978 A1* | 8/2014 | Saban | H04N 1/622 348/14.07 |
| 2014/0279192 A1* | 9/2014 | Selby | G06Q 30/0631 705/26.7 |
| 2014/0285522 A1* | 9/2014 | Kim | G06T 19/006 345/633 |
| 2014/0330670 A1 | 11/2014 | Ainsworth | |
| 2014/0368499 A1 | 12/2014 | Kaur | |
| 2015/0154453 A1 | 6/2015 | Wilf | |
| 2015/0154691 A1 | 6/2015 | Curry et al. | |
| 2015/0324103 A1 | 11/2015 | Tepmongkol et al. | |
| 2015/0379623 A1 | 12/2015 | Gadre | |
| 2016/0035061 A1 | 2/2016 | Gadre et al. | |
| 2016/0042402 A1 | 2/2016 | Gadre et al. | |
| 2016/0063588 A1 | 3/2016 | Gadre et al. | |
| 2016/0071321 A1 | 3/2016 | Nishiyama et al. | |
| 2016/0088284 A1 | 3/2016 | Sareen et al. | |
| 2016/0110595 A1 | 4/2016 | Wang et al. | |
| 2018/0137515 A1 | 5/2018 | Higgins et al. | |

FOREIGN PATENT DOCUMENTS

| | | |
|---|---|---|
| WO | 2016/022937 A1 | 2/2016 |
| WO | 2016/019033 A3 | 5/2016 |

OTHER PUBLICATIONS https://www.youtube.com/watch?v=QHAyOtLuqtY (dated Apr. 29, 2011).*

Using a Clinometer to Measure Height, Instructables, http://www.instructables.com/id/Using-a-clinometer-to-measure-height/; Apr. 23, 2013 (Year: 2013).*

"U.S. Appl. No. 13/725,209, Final Office Action dated Feb. 26, 2016", 12 pgs.

"U.S. Appl. No. 13/725,209, Non Final Office Action dated Sep. 9, 2016", 11 pgs.

"U.S. Appl. No. 13/725,209, Response filed Jan. 6, 2016 to Non Final Office Action dated Oct. 6, 2015", 17 pgs.

"U.S. Appl. No. 13/725,209, Response filed May 26, 2016 to Final Office Action dated Feb. 26, 2016", 10 pgs.

Rosenfeld, Azriel, "Picture Processing by Computer", Academic Press (1969), 28 pgs.

"3D Scanning Services—Konica Minolta 3D Scanning Labs", [Online]. Retrieved from the Internet: <URL: http://sensing.konicaminolta.us/search-by-services/3d-scanning-services/>, (Accessed Feb. 15, 2013), 2 pgs.

"A Brief Overview of Gesture Recognition", This page is maintained by Charles Cohen and sponsored by Cybernet Systems Corporation,, [Online]. Retrieved from the Internet: <URL: http://homepages.inf.ed.ac.uk/rbf/CVonline/LOCAL_COPIES/COHEN/gesture_o>, (Accessed Feb. 14, 2013), 17 pgs.

"U.S. Appl. No. 13/725,209, Final Office Action dated May 8, 2014", 7 pgs.

"U.S. Appl. No. 13/725,209, Non Final Office Action dated Jan. 17, 2014", 8 pgs.

"U.S. Appl. No. 13/725,209, Non Final Office Action dated Oct. 20, 2014", 8 pgs.

"U.S. Appl. No. 13/725,209, Response filed Apr. 17, 2014 to Non Final Office Action dated Jan. 17, 2014", 15 pgs.

"U.S. Appl. No. 13/725,209, Response filed Sep. 8, 2014 to Final Office Action dated May 8, 2014", 10 pgs.

"Gesture Design Blog: Gestural Intent", [Online]. Retrieved from the Internet: <URL: http://gesturedesignblog.com/?page_id=63>, (Mar. 15, 2010), 4 pgs.

"Gesture recognition—Wikipedia, the free encyclopedia", [Online]. Retrieved from the Internet: <URL: http://en.wikipedia.org/wiki/Gesture_recognition>, (Accessed Feb. 15, 2013), 6 pgs.

"Gesture Technology—Virtual Dressing rooms!! Punitatanna's Blog", [Online]. Retrieved from the Internet: <URL: http://punitatanna.wordpress.com/2010/08/31/gesture-technology-virtual-dressing-rooms/>, (Aug. 31, 2010), 5 pgs.

"Gestures control true 3D display", [Online]. Retrieved from the Internet: <URL: Info collage around internet: Gestures control true 3D display>, (Dec. 29, 2004), 2 pgs.

"GestureTek", GestureTeck Inc. is Purchased Back by Co-Founder Vincent John Vincent, [Online]. Retrieved from the Internet: <URL: http://www.gesturetek.com/>, (Accessed Feb. 15, 2013), 1 pg.

"Get Your Converse Shoes on Virtually Using Augmented Reality", © 2012 DigitalAnalog—An Online Publication for Creativity + Code., [Online]. Retrieved from the Internet: <URL: http://digitalanalog.in/2011/03/14/get-your-converse-shoes-on-virtually-using-augmented-reality/>, (Mar. 14, 2011), 7 pgs.

"HowStuffWorks: Electronics", [Online]. Retrieved from the Internet: <URL: http://electronics.howstuffworks.com/>, (Accessed Feb. 14, 2013), 2 pgs.

"Kinect—Wikipedia, the free encyclopedia", (Accessed Feb. 15, 2013), 16 pgs.

"Kinect Body Scanning—Body Scanning Reinvented", [Online]. Retrieved from the Internet: <URL: http://www.styku.com/business/benefits/bodyscanning/>, (Accessed Feb. 15, 2013), 2 pgs.

"kinect_calibration/technical—ROS Wiki", [Online]. Retrieved from the Internet: <URL: http://www.ros.org/wiki/kinect_calibration/technical>, (Accessed Feb. 15, 2013), 8 pgs.

"Metail: translating cutting edge research into commercial success", [Online]. Retrieved from the Internet: <URL: http://www.eng.cam.ac.uk/news/stories/2012/Me_tail/>, (Mar. 15, 2012), 5 pgs.

"My Style Rules—The way you were meant to dress", [Online]. Retrieved from the Internet: <URL: http://mystylerules.com/>, (Accessed Feb. 15, 2013), 1 pg.

"SketchUp—How to Information | eHow.com", [Online]. Retrieved from the Internet: <URL: http://www.ehow.com/sketchup/>, (Accessed Feb. 15, 2013), 27 pgs.

"Skyrim Kinect—YouTube", [Online]. Retrieved from the Internet: <URL: http://www.youtube.com/watch?v=Z83wzJwrBK0>, (Accessed Feb. 14, 2012), 2 pgs.

(56) References Cited

OTHER PUBLICATIONS

"The Future of Shopping Is Here", Copyright © 2012 Simply Zesty, [Online]. Retrieved from the Internet: <URL: http://www.simplyzesty.com/advertising-and-marketing/the-future-of-shopping-is-here-video/>, (Jun. 12, 2012), 9 pgs.
"Top 10 Best Kinect Hacks", [Online]. Retrieved from the Internet: <URL: http://www.kinecthacks.com/top-10-best-kinect-hacks>, (Accessed Feb. 15, 2013), 6 pgs.
"Trying on Shoes Made Easy at the Adidas Shop in Paris", © 2012 Sugar Inc. • Insanely Addictive™, [Online]. Retrieved from the Internet: <URL: http://www.geeksugar.com/Trying-Shoes-Made-Easy-Adidas-Shop-Paris-159420>, (Mar. 6, 2007), 5 pgs.
"Virtual Dressing Room", Wikipedia, the free encyclopedia, [Online]. Retrieved from the Internet: <URL: http://en.wikipedia.org/wiki/Virtual_dressing_room>, (Accessed Feb. 14, 2013), 4 pgs.
Baudel, Thomas, et al., "CHARADE: Remote Control of Objects using Free-Hand Gestures", [Online]. Retrieved from the Internet: <URL: http://thomas.baudel.name/Morphologie/cacm.html>, (Accessed Feb. 15, 2013), 9 pgs.
Billinghurst, Mark, et al., "Chapter 14: Gesture Based Interaction", [Online]. Retrieved from the Internet: <URL: http://www.billbuxton.com/input14.Gesture.pdf >, (Aug. 24, 2011), 35 pgs.
Cordier, Frederic, et al., "Made-to-Measure Technologies for Online Clothing Store", [Online]. Retrieved from the Internet: <URL: http://www.miralab.ch/repository/papers/25.pdf>, (Accessed Feb. 15, 2013), 12 pgs.
Crawford, Stephanie, "HowStuffWorks: How Microsoft Kinect Works", [Online]. Retrieved from the Internet: <URL: http://electronics.howstuffworks.com/microsoft-kinect.htm>, (Accessed Feb. 14, 2013), 2 pgs.
Daly, Erica, "This is the Year of the Virtual Fit Assistant | Techli", [Online]. Retrieved from the Internet: <URL: http://techli.com/2011/11/year-of-virtual-fit-assistant/>, (Nov. 16, 2011), 3 pgs.
Higgins, Krystal, "Designing Kinect-Based Experiences", [Online]. Retrieved from the Internet: <URL: http://www.kryshiggins.com/thoughts-on-designing-kinect-based-experiences/>, (Apr. 4, 2011), 12 pgs.
Hunter, Seth, et al., "WordPlay: A Table-Top Interface for Collaborative Branstorming and Decision Making", Proceedings of IEEE Tabletops and Interactive Surfaces, 2008, [Online]. Retrieved from the Internet: <URL: http://fluid.media.mit.edu/sites/default/files/WordPlayFinalIEEE_AffiliationIncluded.pdf>, (2008), 4 pgs.
Kimbrel, Heather, "How to Create a Virtual Model of My Body Measurements | eHow.com", [Online]. Retrieved from the Internet: <URL: http://www.ehow.com/how_6817795_create-virtual-model-body-measurements.html>, (Accessed Feb. 15, 2013), 3 pgs.
Li, Rong, et al., "Research of Interactive 3D Virtual Fitting Room on Web Environment", ISCID Proceedings of the 2011 Fourth International Symposium on Computational Intelligence and Design—vol. 1, [Online]. Retrieved from the Internet: <URL: http://ieeexplore.ieee.org/xpl/articleDetails.jsp?reload=true&arnumber=6079627&contentType=Conference+Publications>, (2011), 32-35.
Maccormick, John, "How does the Kinect work?", [Online]. Retrieved from the Internet: <URL: http://users.dickinson.edu/~jmac/selected-talks/kinect.pdf>, (Accessed Feb. 15, 2013), 52 pgs.
Newitz, Annalee, "10 physical gestures that have been patented", (Jun. 6, 2011), 5 pgs.
Nickinson, Phil, "Front-facing cameras mean hand-free gesture commands for Android", [Online]. Retrieved from the Internet: <URL: http://www.androidcentral.com/front-facing-cameras-mean-hands-free-gesture-co . . . >, (Accessed Feb. 14, 2013), 6 pgs.
Saldanha, Carlos, et al., "System and Method for Displaying Selected Garments on a Computer-Simulated Mannequin", [Online]. Retrieved from the Internet: <URL: http://www.faqs.org/patents/app/20100302275>, (Dec. 2, 2010), 10 pgs.
Slawski, Bill, "Would You Give a Search Engine a 3D Model of Your Body?—SEO by the Sea", [Online]. Retrieved from the Internet: <URL: http://www.seobythesea.com/2009/01/would-you-give-a-search-engine-a-3d-model-of-your-body/>, (Jan. 16, 2009), 11 pgs.
Sterling, Bruce, "Beyond the Beyond—Augmented Reality: Kinect fitting-room for TopShop, Moscow", [Online]. Retrieved from the Internet: <URL: http://www.wired.com/beyond_the_beyond/2011/05/augmented-reality-kinect-fitting-room-for-topshop-moscow/>, (May 10, 2011), 2 pgs.
Stevens, Tim, "Apple patent application opens the door to free-form acoustic gesture commands", [Online]. Retrieved from the Internet: <URL: http://www.engadget.com/2011/02/21/apple-patent-application-opens-the-door-to . . . >, (Feb. 21, 2011), 3 pgs.
Woolley, Richard, "Gesture Commands Performed in Proximity but Without Make Physical Contact with a Touchpad", [Online]. Retrieved from the Internet: <URL: http://www.faqs.org/patents/app/20090167719>, (Jul. 2, 2009), 4 pgs.
"U.S. Appl. No. 13/725,209, Final Office Action dated Apr. 8, 2015", 10 pgs.
"U.S. Appl. No. 13/725,209, Non Final Office Action dated Oct. 6, 2015", 12 pgs.
"U.S. Appl. No. 13/725,209, Response filed Mar. 20, 2015 to Non Final Office Action dated Oct. 20, 2015", 23 pgs.
"U.S. Appl. No. 13/725,209, Response filed Jul. 8, 2015 to Final Office Action dated Apr. 18, 2015", 19 pgs.
Response to Final Office Action filed on Feb. 13, 2018 for U.S. Appl. No. 14/472,125, dated Oct. 13, 2017, 10 pages.
Response to Non-Final Office Action filed on Aug. 31, 2017 for U.S. Appl. No. 14/472,125, dated May 31, 2017, 14 pages.
Preliminary Amendment for U.S. Appl. No. 15/868,167, filed Jan. 18, 2018, 9 pages.
"About Fits.me—Virtual Fitting Room", Retrieved from the Internet: URL: <http://fits.me/about/about-fits-me>, Accessed on May 27, 2014, 5 pages.
"Fitnect", 3D Virtual Fitting Dressing Room/Mirror, Fitnect Interactive, Retrieved from the Internet: <URL: http://www.fitnect.hu/>, Accessed on May 27, 2014, 1 page.
Julian, Horsey, "Augmented Reality App Allows You to Try Clothes Before You Buy in a Virtual Dressing Room (video)", Sep. 29, 2010, 9 pages.
Pierrepont, Nathalie, "Amongst Promises of a Perfect Fit, What Fits and What Doesn't?", Retrieved from the Internet: <URL: http://www.businessoffashion.com/20 12/ 12/fashion-2-0-amongst -promises-of -a-perfect -fit -Whatfits- and-what-doesn't.html>, Dec. 19, 2012, 5 pages.
"Online clothes-shopping: is an avatar the answer", The Guardian, Retrieved from the Internet: <URL: http://www.theguardian.com/fashion/shortcuts/20 12/feb/29/online-clothesshopping- avatar>, Accessed on May 27, 2014, 4 pages.
Wulfhart, Neil, "The Future of Shopping: An Avatar Lets You Find the Perfect Fit", Retrieved from the Internet: <URL: http://www.slate.com/blogs/future_tense/2012/07/19/me_ality_body_scanner_creates_an_avat ar to make clothes shopping a breeze .html, Accessed on Jul. 19, 2012, 4 pages.
International Preliminary Report on Patentability received for PCT Application No. PCT/US2015/037663, dated Jan. 5, 2017, 10 pages.
International Search Report received for PCT Application No. PCT/US2015/037663, dated Sep. 14, 2015, 2 pages.
International Written Opinion received for PCT Application No. PCT/US2015/037663, dated Sep. 14, 2015, 8 pages.
International Preliminary Report on Patentability received for PCT Application No. PCT/US2015/042683, dated Feb. 16, 2017, 7 pages.
International Search Report received for PCT Application No. PCT/US2015/042683, dated Mar. 29, 2016, 2 pages.
International Written Opinion received for PCT Application No. PCT/US2015/042683, dated Mar. 29, 2016, 5 pages.
International Preliminary Report on Patentability received for PCT Application No. PCT/US2015/044249, dated Feb. 16, 2017, 7 pages.
International Search Report received for PCT Application No. PCT/US2015/044249, dated Oct. 23, 2015, 2 pages.
International Written Opinion received for PCT Application No. PCT/US2015/044249, dated Oct. 23, 2015, 5 pages.
Applicant Initiated Interview Summary received for U.S. Appl. No. 13/679,498, dated Aug. 21, 2017, 3 pages.

(56) References Cited

OTHER PUBLICATIONS

Applicant Initiated Interview Summary received for U.S. Appl. No. 13/679,498, dated May 2, 2016, 3 pages.
Corrected Notice of Allowability received for U.S. Appl. No. 13/679,498, dated Jan. 8, 2018, 10 pages.
Final Office Action received for U.S. Appl. No. 13/679,498, dated Jan. 22, 2016, 37 pages.
Final Office Action received for U.S. Appl. No. 13/679,498, dated Jun. 18, 2015, 37 pages.
Final Office Action received for U.S. Appl. No. 13/679,498, dated Nov. 4, 2016, 37 pages.
Non-Final Office Action received for U.S. Appl. No. 13/679,498, dated Jan. 30, 2015, 30 pages.
Non-Final Office Action received for U.S. Appl. No. 13/679,498, dated Jun. 30, 2016, 37 pages.
Non-Final Office Action received for U.S. Appl. No. 13/679,498, dated May 15, 2017, 39 pages.
Non-Final Office Action received for U.S. Appl. No. 13/679,498, dated Sep. 4, 2015, 30 pages.
Notice of Allowance received for U.S. Appl. No. 13/679,498, dated Oct. 5, 2017, 12 pages.
Response to Final Office Action filed on Apr. 4, 2017, for U.S. Appl. No. 13/679,498, dated Nov. 4, 2016, 13 pages.
Response to Final Office Action filed on Aug. 18, 2015, for U.S. Appl. No. 13/679,498, dated Jun. 18, 2015, 12 pages.
Response to Final Office Action filed on May 23, 2016, for U.S. Appl. No. 13/679,498, dated Jan. 22, 2016, 14 pages.
Response to Non-Final Office Action filed on Apr. 30, 2015 for U.S. Appl. No. 13/679,498, dated Jan. 30, 2015, 16 pages.
Response to Non-Final Office Action filed on Aug. 31, 2017 for U.S. Appl. No. 13/679,498, dated May 15, 2017, 12 pages.
Response to Non-Final Office Action filed on Dec. 4, 2015 for U.S. Appl. No. 13/679,498, dated Sep. 4, 2015, 13 pages.
Response to Non-Final Office Action filed on Sep. 30, 2016 for U.S. Appl. No. 13/679,498, dated Jun. 30, 2016, 15 pages.
Final Office Action received for U.S. Appl. No. 14/315,230, dated Sep. 14, 2017, 23 pages.
Non-Final Office Action received for U.S. Appl. No. 14/315,230, dated Dec. 30, 2016, 23 pages.
Response to Final Office Action filed on Feb. 12, 2018, for U.S. Appl. No. 14/315,230, dated Sep. 14, 2017, 13 pages.
Response to Non-Final Office Action filed on May 30, 2017, for U.S. Appl. No. 14/315,230, dated Dec. 30, 2016, 14 pages.
Applicant Initiated Interview Summary received for U.S. Appl. No. 14/450,177, dated Jun. 29, 2018, 3 pages.
Final Office Action received for U.S. Appl. No. 14/450,177, dated Apr. 2, 2018, 12 pages.
Final Office Action received for U.S. Appl. No. 14/450,177, dated Mar. 3, 2017, 11 pages.
Non-Final Office Action received for U.S. Appl. No. 14/450,177, dated Aug. 9, 2016, 14 pages.
Non-Final Office Action received for U.S. Appl. No. 14/450,177, dated Aug. 25, 2017, 11 pages.
Response to Final Office Action filed on Aug. 3, 2017, for U.S. Appl. No. 14/450,177, dated Mar. 3, 2017, 12 pages.
Response to Non-Final Office Action filed Feb. 26, 2018, for U.S. Appl. No. 14/450,177, dated Aug. 25, 2017, 13 pages.
Response to Non-Final Office Action filed on Feb. 9, 2017, for U.S. Appl. No. 14/450,177, dated Aug. 9, 2016, 14 pages.
Non-Final Office Action received for U.S. Appl. No. 14/454,619, dated Jan. 3, 2018, 20 pages.
Response to Non-Final Office Action filed on Jun. 4, 2018, for U.S. Appl. No. 14/454,619 , dated Jan. 3, 2018, 17 pages.
Final Office Action received for U.S. Appl. No. 14/472,125, dated Oct. 13, 2017, 18 pages.
Non-Final Office Action received for U.S. Appl. No. 14/472,125 , dated Jul. 12, 2018, 20 pages.
Non-Final Office Action received for U.S. Appl. No. 14/472,125, dated May 31, 2017, 16 pages.

\* cited by examiner

PROVIDING A VIRTUAL SHOPPING ENVIRONMENT FOR AN ITEM

TECHNICAL FIELD

The subject matter disclosed herein generally relates to the technical field of virtual marketplaces and more specifically providing a virtual shopping environment for an item.

BACKGROUND

Shopping for clothes, apparel, garments, or other items in a physical (e.g. non-online) environment can be an arduous task. A consumer may experience delays due to travelling, parking, walking, finding available sales personnel, and waiting in purchase lines. With the advent of online shopping, consumers may purchase items while staying home, via a computer or any electronic device connected to the Internet. However, because a virtual consumer may not physically try a purchased item, the item may not fit the particular consumer as expected or may not look as the consumer expected.

BRIEF DESCRIPTION OF THE DRAWINGS

Some embodiments are illustrated by way of example and not limitation in the figures of the accompanying drawings.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example systems and methods for providing a virtual item shopping environment are described. The systems may include instructions to produce a virtual item shopping environment. Additionally, systems described herein may combine a video of a consumer with a three dimensional model of an item based on various body shapes/dimensions, may provide item availability, and may provide purchase options for the consumer.

Figure 1:
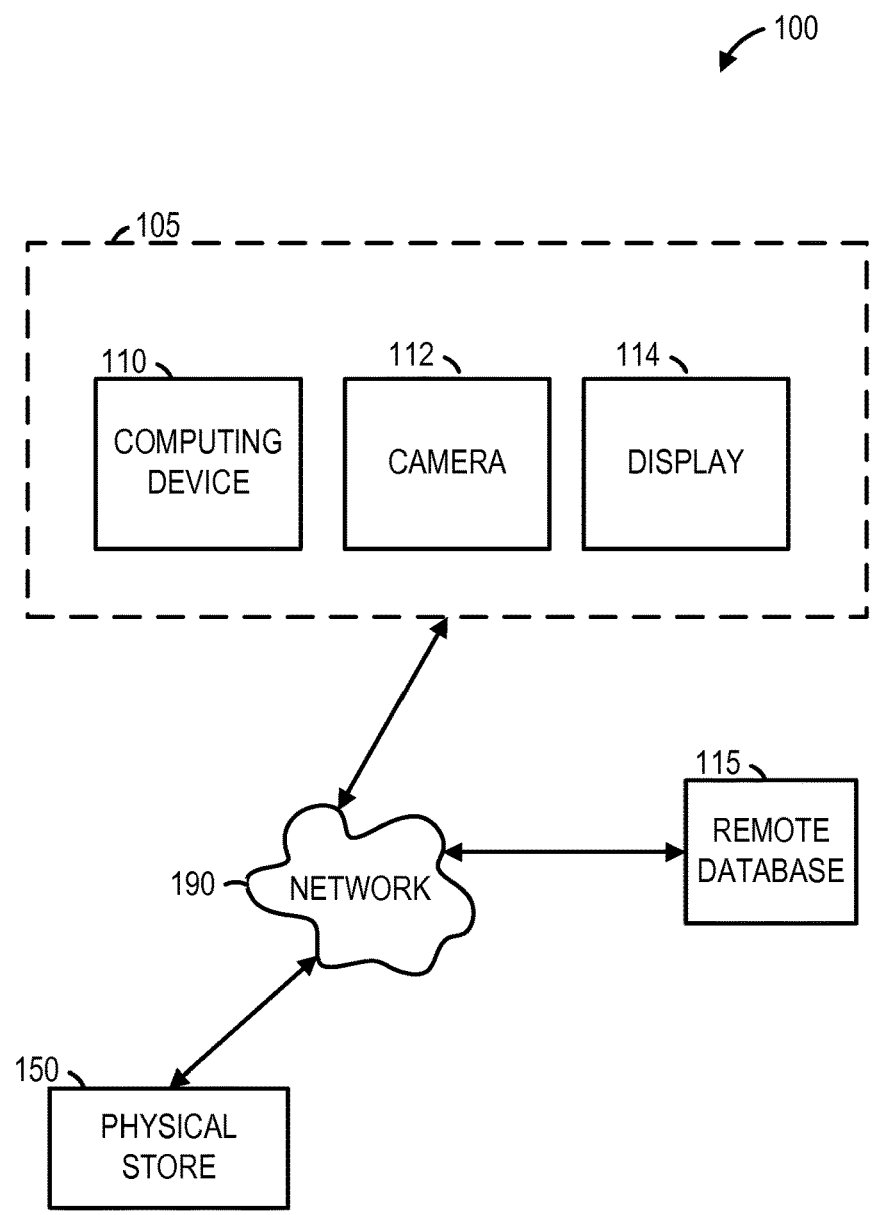
FIG. 1 is a block diagram illustrating a system, in accordance with an example embodiment, providing a virtual item shopping environment.

FIG. 1 is a network diagram illustrating a network environment 100 suitable for providing a virtual item shopping environment, according to some example embodiments. The network environment 100 may include a system 105 that includes a computing device 110, a camera 112, and a display 114. The computing device 110 may be operatively coupled with the camera 112 and the display 114. The computing device 110 may receive live video from the camera 112 and may generate live real-time video to be displayed via the display 114.

In other embodiments, the system 105 may communicate with a remote database 115 via a network 190. The computing device may be implemented in a computer system, in whole or in part, as described below with respect to FIG. 13. In one embodiment, the remote database 115 may provide requested data records to the computing device 110. As will be described in subsequent paragraphs, the remote database 115 may store data regarding items available for display via the display 114.

As described herein, a system according to certain embodiments may provide a display combining live video of a potential consumer with an overlay of an item that may be purchased by the consumer. As described herein, a live video may include video being received while generating imagery for the display 114. Therefore, in certain embodiments, the live video may not be prerecorded or read from a non-volatile storage device.

An item, as described herein, may include a wide variety of items and is not limited to any certain items or types of items. In certain examples, an item may include wearable items such as, but not limited to, garments, apparel, clothes, underwear, bras, hats, coats, jackets, sweaters, shirts, blouses, dresses, pants, skirts, kilts, socks, shoes, sandals, or other, or the like. In other examples, an item may include jewelry, rings, toe rings, watches, bracelets, necklaces, earrings, nose rings, other rings, other pierced items, other wearable items or articles, or other, or the like. Of course, one skilled in the art may appreciate other items that may be worn by a person.

In another embodiment, an item may include an item or article that a person may carry. In certain examples, an item may include, a wallet, a handbag, a purse, a pouch, a backpack, a fanny-pack, or other, or the like. In one embodiment, an item may include an item that may modify an appearance of a person. In certain examples, an item may include make-up, eye shadow, foundation, eye liner, mascara, contact lenses, glasses, a wig, a tattoo, or other, or the like.

In one embodiment, an item may include an item in an environment of a person. In certain examples, an item may include a car, a motorcycle, another vehicle, household items, furniture, décor, light fixtures, lamps, or other household items, other people, famous people, or other. Therefore, as described and claimed herein, an item is not limited to any kind or types of physical item and this disclosure is meant to include all items as one skilled in the art may appreciate.

Any of the machines, databases, or devices shown in FIG. 1 may be at least partially implemented in a general-purpose computer modified (e.g., configured or programmed) by software (e.g., one or more software modules) to be a special-purpose computer to perform one or more of the functions described herein for that machine, database, or device. In certain examples, a special-purpose computer may communicate with other devices to perform certain functions. For example, a special-purpose computer may capture video by receiving video from a camera. In another example, a special-purpose computer may be configured to display by transmitting data to a physical display to be displayed.

In certain examples, a computer system able to implement any one or more of the methodologies described herein is discussed below with respect to FIG. 12. As used herein, a remote "database" may be a data storage resource and may store data structured as a text file, a table, a spreadsheet, a relational database (e.g., an object-relational database), a triple store, a hierarchical data store, or other, or the like as one skilled in the art may appreciate. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the device 110 and the database 115). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., Wi-Fi network or WiMAX network), or any suitable combination thereof.

Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In one embodiment, the network environment 100 may include a physical store 150. The physical store 150 may include a retail store, a warehouse, other storage facility, or other, or the like. In certain embodiments, the physical store 150 may include an inventory of items as described herein. The remote database 115 may track a set of available items physically located in the physical store 150. Therefore, in certain embodiments, the computing device 110 may receive database records from the remote database 115 that may represent items available at the physical store 150. This may allow a user of the computing device 110 to query regarding items available at the physical store. In another embodiment, the physical store 150 may be geographically located in proximity to the system 105, but of course, this is not necessarily the case.

In one example, the system 105 may be physically located just outside the physical store 150. Such a configuration of components may allow a customer to virtually browse items that may be physically available inside the store. A consumer may browse, and purchase one or more items using the system 105 and may subsequently pick-up the purchased items without requiring additional travel, or waiting for shipping of a the item. Use of the system 105 may also allow the user to only need to step into the physical store 150 to pick up the item, as selection and purchase of the item may be handled by the system 105.

In other embodiments, the remote database 115 may track items available at remote locations. For example, a chain of stores may include items not available at specific locations. The system 105 may allow a consumer to virtually try-on an item and purchase the item. In response to the ordered item not being available at the physical location near the system 105, the computing device 110 may ship the ordered item to a remote location provided by the consumer, or to a physical store 150 closer to the consumer.

Figure 2:
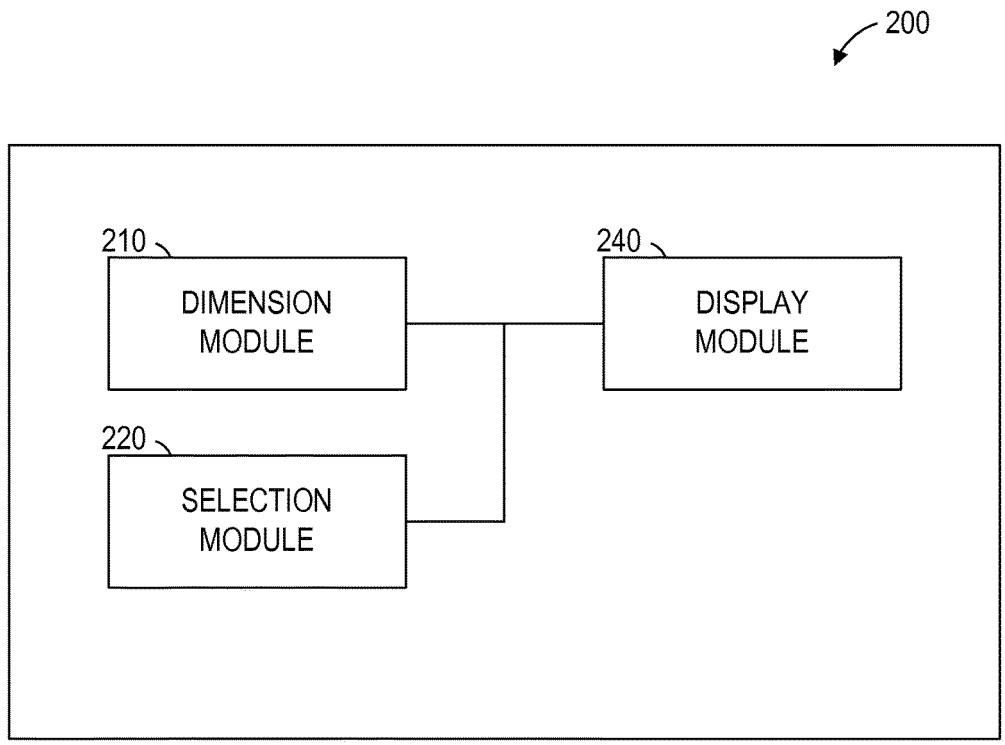
FIG. 2 is a block diagram illustrating a computing device in accordance with embodiments of the present disclosure.

FIG. 2 is an illustration depicting components of a computing device 110 suitable for providing a virtual item shopping environment in accordance with embodiments of the present disclosure. In one embodiment, the computing device 110 may include a dimension module 210, a selection module 220, and a display module 240, all configured to communicate with each other (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In one embodiment, the system 105 may include the camera 112, the display 114, and the computing device 110. The computing device 110 may include the dimension module 210, a display module 240, and a selection module 220. In one embodiment, the camera 112 may be configured to capture live video of a person near the display 114.

In certain embodiments, the computing device 110 may cause the camera to aim the camera at a person near the display 114. In some embodiments, the computing device 110 may direct the camera towards a top half of a person near the display. In other embodiments, the computing device 110 may zoom in or zoom out the camera. For example, the computing device 110 may cause the camera 112 to zoom out in order to view the full body of a person near the display 114. The computing device 110 may affect the camera in a wide variety of different ways in order to focus on certain parts of the person as one skilled in the art may appreciate. Therefore, this disclosure is not limited in this regard.

In another embodiment, the computing device 110 may include a dimension module 210 configured to determine one or more dimensions of the person based on the live video. The dimension module 210 may determine a height of the person, a width of the person, a size of the person, a weight of the person, body curvature of the person, or other physical features viewable by the camera 112. In other embodiments, the dimension module 210 may approximate a dimension of the person in response to the person wearing loose fitted clothing. For example, the person may be wearing a large overcoat. In response, the dimension module 210 may estimate a shape or size of the person based on dimensions of the overcoat.

In one example, a person may be tall and not generally heavy set, but may have a large abdomen. The dimension module 210 may further determine that a certain size of an item may fit the person based, at least in part, on unique body curvature (the large abdomen). Certain people may have larger or smaller parts of their bodies and the dimension module 210 may adjust a size for an item to accommodate the unique body curvature, or unique sizes of certain body parts.

In other embodiments, the dimension module 210 may determine a gender of the person based, at least in part, on dimensions of the person, size or existence of certain body parts, make-up, hair style, or the like.

In certain embodiments, the dimension module 210 may determine an appropriate item size for the person. In one example, a specific person may be slender in certain areas and less slender in other areas. For example, the person may have large hips. In order to accommodate unique body curvature parameters, the dimension module 210 may determine that an appropriate size for a blouse may be smaller than an appropriate size for a dress (e.g. to accommodate larger hips). Therefore, the dimension module 210 may determine a size for a blouse may be a size 4 whereas a size for a dress may be a size 8. In other examples, the dimension module 210 may determine a size for an item based on a ratio between a height and a weight of the person.

In one embodiment, the dimension module 210 may be configured to determine one or more dimensions using data from the camera and a pre-determined point of reference. A pre-determined point of reference may provide the computing device 110 with sufficient dimensionality to determine physical measurements based on the live video.

In one example, the person may be located at a pre-determined location. Based on knowledge of the person being a known distance away from the camera and a size of the person in the live video, the dimension module 210 may determine a height of the person as one skilled in the art may appreciate.

In another embodiment, the dimension module 210 may be configured to measure a dimension of the person using data from two or more cameras. As one skilled in the art may appreciate, combining video data from two or more cameras, and coordinating similar points between the videos may provide sufficient dimensionality to determine physical measurements based on the video signals.

In one example, the dimension module 210 may identify common points between the two video signals. Based on knowledge of a pointing angle of the cameras and the locations of the common points, the dimension module 210 may determine a physical distance from the cameras and the person. Furthermore, the dimension module 210 may determine physical distances and/or measurements of the person.

Based, at least in part, on physical measurements of the person (e.g. height, weight, width, body curvature, size), the dimension module 210 may determine a size for an item. In another embodiment, the dimension module 210 may be further configured to adjust a size of the selected item based on a brand of the selected item and information about dimensions of the size for the brand.

For example, an item brand A may use sizes that closely represent industry standard sizes, however, an item brand B may consistently provide items that are larger than industry standard sizes. Therefore, although the dimension module 210 may determine a size of the person to be a size 6, in response to an item being of brand B, the dimension module 210 may adjust the size from a size 6 to a size 4. Based, at least in part, on information about dimensions of the size for the brand, the dimension module 210 may adjust determined sizes of the person. Such adjustments may result in a set of items that more accurately represent a size of the person, although specific numbers of sizes may vary slightly between brands of items.

In another embodiment, the system 110 may include a selection module 220 configured to select one or more items from a database based on the determined dimensions. A database 115 may store data records in a wide variety of different formats, arrangements, files, memory, or other, or the like, as one skilled in the art may appreciate. The database 115 may track item brands, sizes, physical dimensions, weights, colors, patterns, or the like. In other embodiments, the database 115 may store relationships between other items. For example, the database 115 may store links between articles of clothing that blend well together. In another embodiment, the database 115 may store popular color patterns or combinations of colors, such that the database may recommend appropriate colors for cooperating items based, at least in part, on color patterns, popular trends, combinations that other consumers have purchased together, historical connections, or the like. In another embodiment, the database 115 may store popular brands, configurations, colors, patterns, or the like. In one embodiment, the database 115 may receive associations between items from a user of the database, another computing device, or other.

In one embodiment, the database 115 may store a specific item size for the item, such as, but not limited to a size 4. In another embodiment, the database 115 may store physical measurements of the item, such as, but not limited to, physical measurements or distances that may indicate bust, waist, and/or hips sizes of the person.

In other embodiments, the database 115 may store retailer deals, offers, discounts, or the like, for specific articles of clothing, or items. This may allow the database 115 to provide records to items that a retailer may desire selling before other items.

Therefore, in certain embodiments, the dimension module 210 may determine one or more dimensions of the person and may request a set of items from the database that may more likely fit the person.

In one embodiment, the selection module 220 may be configured to receive data records representing a set of items from the database that may more likely fit the person. The display module 240 may present images for the items represented by the data records in a user interface. The selection module 220 may be further configured to receive a selection from the person via a user interface, the selection indicating one of the presented items.

As described herein, a user interface may include any available technology to present and/or receive indications from a person. A user interface may detect gestures by a person, may detect eye movements by the person, may receive touches from the person, may provide a control device, such as, but not limited to, a keyboard, mouse, or other input device. Therefore, the user interface may interact with the person in any way, or to be developed ways and this disclosure is not limited in this regard.

In another embodiment, the selection module 220 may select one or more items from the database based, at least in part, on similarity with items currently on the person. In one example, a consumer may be wearing a cowboy hat. In response to the consumer wearing a cowboy hat, the selection module 220 may include cowboy hats in the selection of items from the database 115.

In another example, in response to a user wearing a dress, the selection module 220 may include one or more dresses. In another example, in response to a person wearing high heeled shoes, the selection module 220 may include high heeled shoes in the selection of items from the database 115.

In another embodiment, the selection module 220 may order selected items based on characteristics of the person. For example, in response to the person having significant tattoos, the selection module 220 may order tattoos before other items or item types. In another example, in response to the consumer wearing a watch, the selection module 220 may order watches ahead of other types of jewelry.

In another embodiment, the system 105 may include the display module 240. The display module 240 may be configured to present one or more items on the display. The display module 240 may retrieve images representing item records received by the database. The database 215 may store and return many planar images for selected items. The display module 240 may present a wide variety of different images via a user interface as one skilled in the art may appreciate.

In another embodiment, the display module 240 may generate a three dimensional (3-D) item based, at least in part, on one or more planar item images. Furthermore, the display module 140 may present the item model on a 3-D body model based on various body shapes/dimensions. The display module 240 may consider the tension or force in the item draped on a body, and how the item flows as the body performs actions.

In one embodiment, the display module 240 may combine live video of a person near the display with the three dimensional model of the item to be displayed. The display module 240 may overlay images of the item on the video of the person.

As described herein, a live real-time video may mean that the video may be received from the camera and updated with the model of the item using available resources and without unnecessary delay. In certain examples, due to processing of the video and item images, the live real-time video may be displayed later than receiving the video signal from the camera. In one example, the delay may be 500 milliseconds or longer. In other examples, the delay may be a few seconds. Of course, this disclosure is not limited in this regard. As technology develops, faster hardware may result in a reduction in an amount of time required to generate the live real-time video.

Therefore, as described herein, real-time does not necessarily mean that there is no delay between receiving the live video and generating, but that there may be no intentional delay between receiving the live video of the person and generating the live real-time video combined with the three dimensional model of the selected item.

In another embodiment, the display module 240 may further include a simulated background. In order to alter a perception of a particular item, the display module 240 may present the live real-time video of the user in combination with the selected item and may include a simulated background. In one embodiment, the selection module 220 may receive a selection from the user indicating a specific background for the live real-time video. In certain examples, the simulated background may be selected from landscape, mountains, meadows, flowers, a dance hall, a dinner scenario, a ballroom, a gazebo, a famous landmark, or other, or the like. A simulated background may further allow a user to see how a particular item may look in different environments. Furthermore, the live real-time video may include a full body view of the person which may further support a consumer's perception of the item.

In other embodiments, the selection module 220 may request items from the database 115 that may be located at a specific physical location that is in proximity of the display 114. In one example, the system 105 may be located near or inside a retail store of items. Limiting the selection of items to those available at a specific physical location may enhance a consumer's ability to discover immediately available items. Providing immediate purchasing and pickup options to a consumer may enhance sales of specific item because a consumer would not have to wait to receive the selected item.

Figure 3:
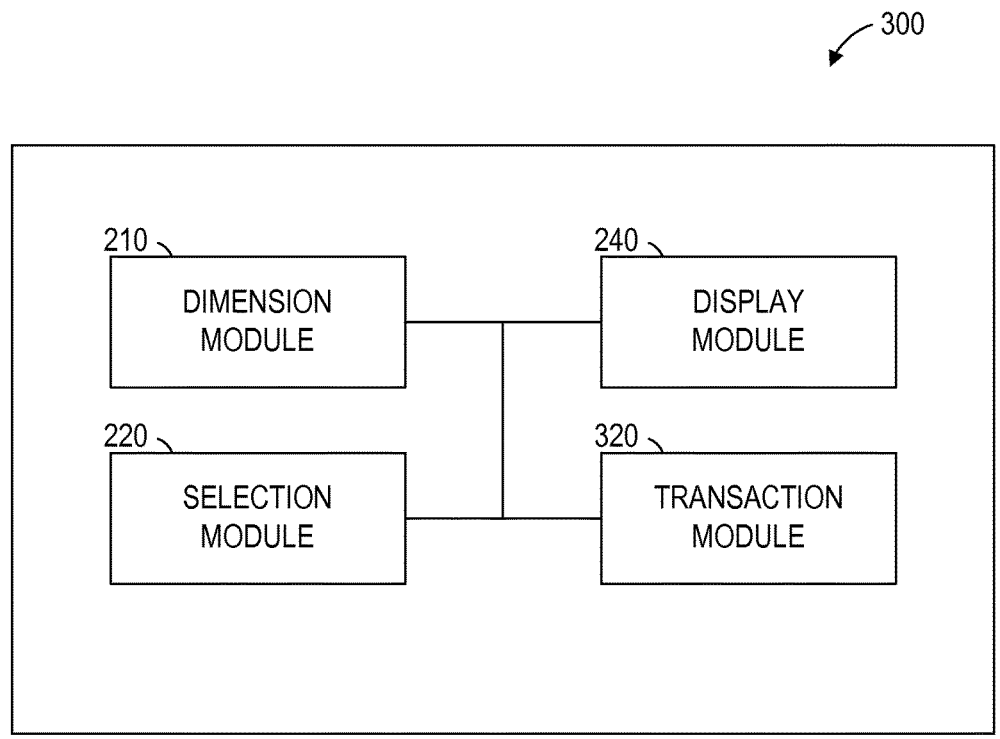
FIG. 3 is a block diagram illustrating an apparatus in accordance with an example embodiment.

FIG. 3 is an illustration depicting components of an apparatus suitable for providing a virtual item shopping environment in accordance with embodiments of the present disclosure. In one embodiment, the apparatus may include the dimension module 210, the selection module 220, the display module 240 and a transaction module 320. The dimension module 210, the selection module 220, and the display module 240 may or may not be substantially similar to those depicted in FIG. 2.

In one embodiment, the transaction module 320 may be configured to receive an indication from the person to purchase the indicated item. In one example, in cooperation with displaying a live real-time view of the person wearing the selected item, the display module 240 may also provide a button allowing a user to select to purchase the displayed item.

The transaction module 320 may receive the indication to purchase the selected item and may request financial information from the person. In certain examples, the transaction module 320 may receive credit card numbers, store purchase card numbers, PayPal® credentials, financial institution numbers, debit card credentials, or other, or the like as one skilled in the art may appreciate.

In other embodiments, the transaction module 320 may store information for certain persons and may retrieve their financial information from local storage without requiring the user to enter the financial information again. This may allow a consumer to purchase a selected item with limited interaction with the system 105.

In another embodiment, the transaction module 320 may be further configured to transmit a request to purchase the indicated item to a financial entity. A financial entity may include, bank, credit union, other funding agency, a transaction system, a payment system, or other system that may facilitate transfer of funds. In one example, the transaction module 320 may provide received credentials for a PayPal® account in order to request funds from the account.

In one embodiment, the transaction module 320 may be further configured to request a specific retail outlet to prepare a package that includes the selected item for pickup. This would allow a user to purchase an item then enter a physical store to simply pick up the prepared package of the selected item.

Figure 4:
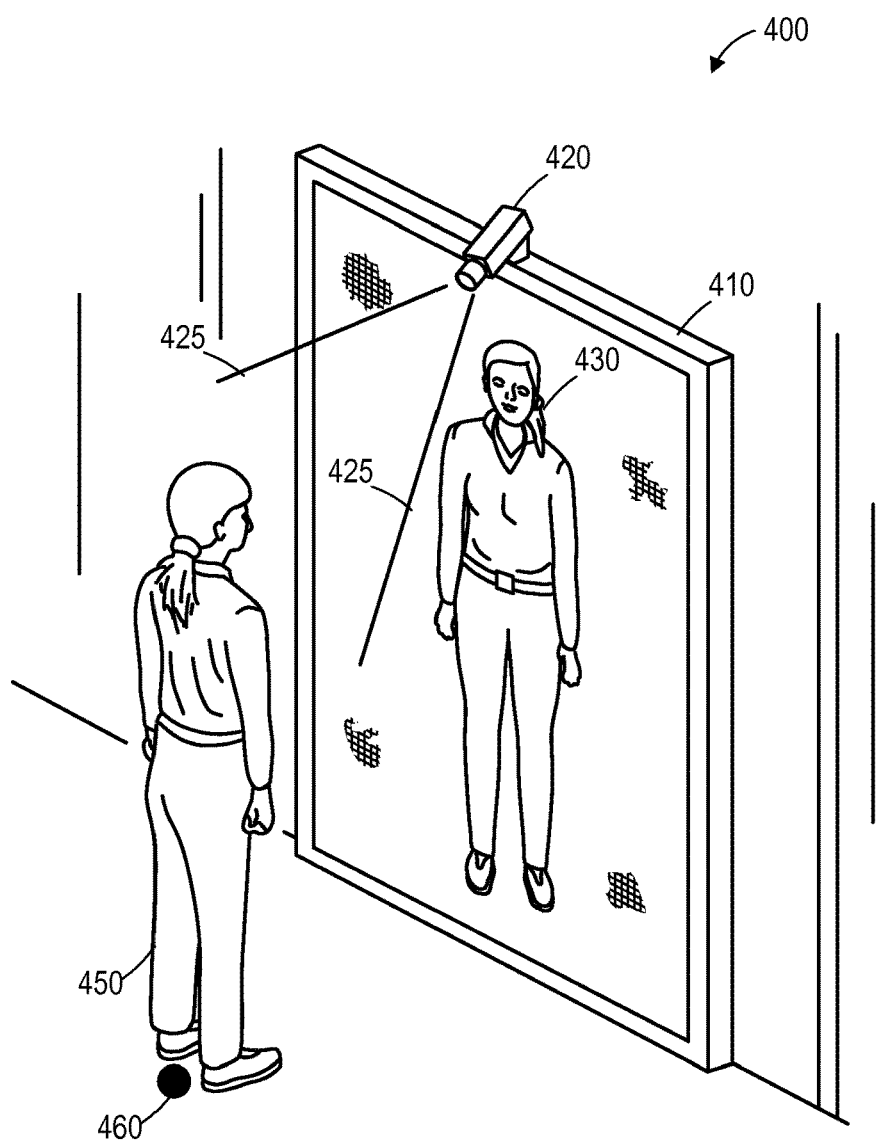
FIG. 4 is a block diagram illustrating a system, in accordance with another example embodiment, providing a virtual shopping environment.

FIG. 4 is an illustration depicting components of a system 400 suitable for providing a virtual item shopping environment in accordance with embodiments of the present disclosure. In one embodiment, the system 400 may include a display 410 and a camera 420.

In one embodiment, the camera 420 may capture live video of a person 450 within a field of view 425 of the camera 420 and near the display 410. The dimension module 210 may determine one or more dimensions of the person 450 by coordinating points in the video with a pre-determined point of reference 460. Because the dimension module 210 may have data representing a distance from the camera 420, the dimension module 210 may determine a size of the person as one skilled in the art may appreciate. The dimension module 210 may determine height, width, weight, or body curvature as previously described.

In one example, the camera 420 may be located near a top edge of the display 410, however this is not necessarily the case as the camera 420 may be located anywhere where it may capture live video of the person 450.

Figure 5:
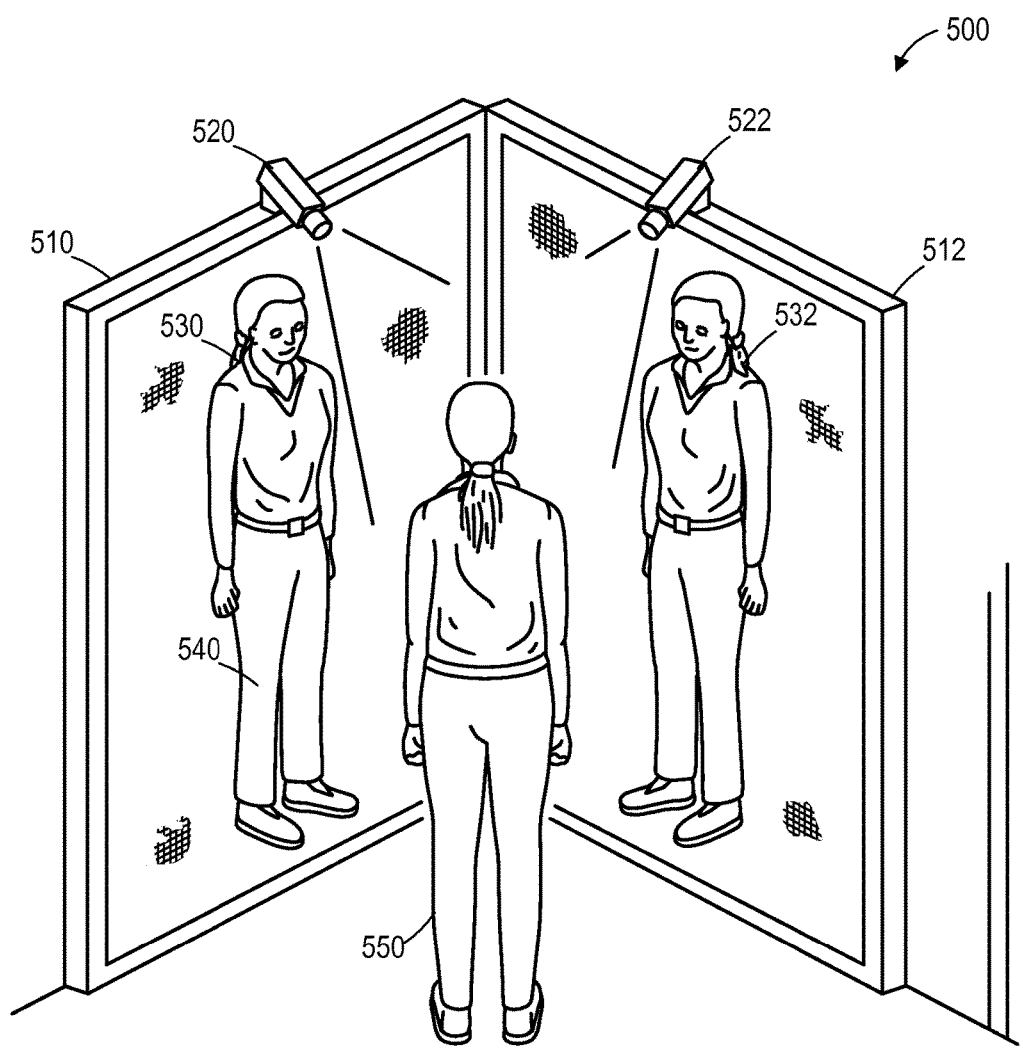
FIG. 5 is a block diagram illustrating a system, in accordance with another example embodiment, providing a virtual shopping environment.

FIG. 5 is an illustration depicting components of a system 500 suitable for providing a virtual item shopping environment in accordance with embodiments of the present disclosure. In one embodiment, the system 500 may include a first display 510, a second display 512, a first camera 520, a second camera 522, and a computing device 110 including a dimension module 210, a selection module 220, and a display module 240. The displays 510,512, the cameras 520,522, the dimension module 210, the selection module 220, and the display module 240 may or may not be substantially similar to those depicted in previous figures.

In one embodiment, the dimension module 210 may determine one or more dimensions of a person 550 near one of the first display 510 or the second display 520. The dimension module 210 may determine a dimension by comparing video signals from the first camera 510 and the second camera 512. As one skilled in the art may appreciate, the dimension module 210 may determine a size or distance of the person using video data from both cameras 510, 512.

In one embodiment, the display module 240 may present a first image 540 of the person 550 on the first display 510. The first image 530 of the person 550 may include a live real-time video of the person 550 captured by the first camera 520 with a three dimensional image of a selected item overlaid on the live video. The display module 240 may concurrently present a second image 532 of the person 550 on the second display 512. The second image 532 of the person 550 may include a live video of the person 550 captured by the second camera 522 with a three dimensional image of a selected item overlaid on the live video. In certain embodiments, the first display and the second display may concurrently present live real-time videos of the person wearing the selected item and at different views of the person 550. As depicted in FIG. 5, the person may be wearing a different item than the virtual item 540 depicted in display 510 and/or 512.

In another embodiment, the display module 240 may be configured to record the live-real time video of the person wearing the virtual item. The display module 240 may then offer an option for the person to transmit the recorded video to a friend. Sharing the live real-time video with another may help the person decide whether or not to purchase the selected item. In an example embodiment, the recorded video may be uploaded to a social networking service to be shared with friends or acquaintances on the social network.

Figure 6:
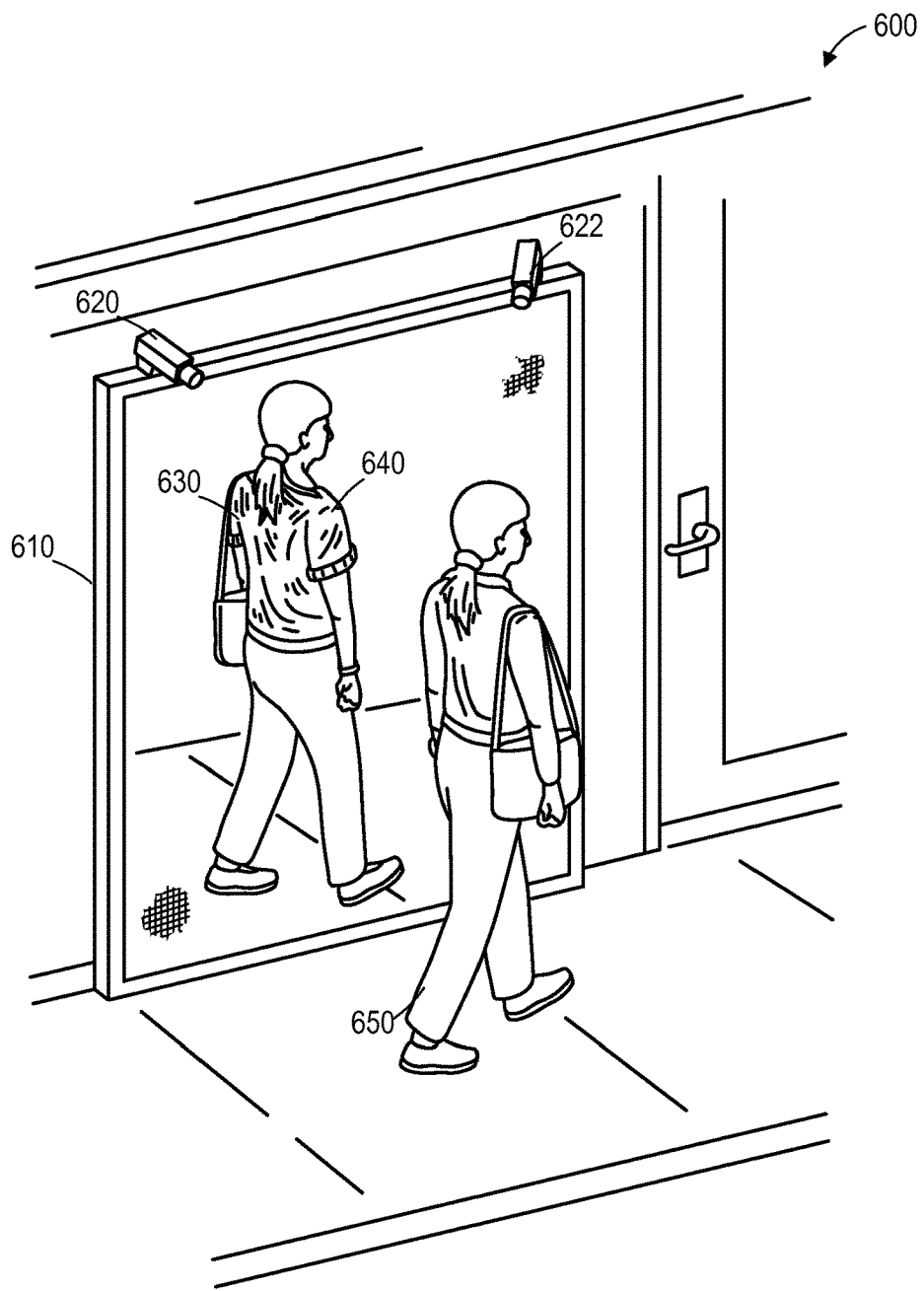
FIG. 6 is a block diagram illustrating a system, in accordance with another example embodiment, providing a virtual shopping environment.

FIG. 6 is an illustration depicting components of a device 600 suitable for providing a virtual item shopping environment in accordance with embodiments of the present disclosure. In one embodiment, the device 600 may include a display 610, a first camera 620, and a second camera 622.

The device 600 may also include a computing device as described herein embodying one or more modules described in this disclosure.

In one embodiment, the device 600 may monitor a person 650 walking past the display 610. The dimension module 210 may determine one or more dimensions of the person 650. The selection module 220 may automatically determine an item available for sale and may select the item without user intervention. The display module 240 may present live video of the person walking by the display 610 with an overlaid view of the selected item.

Providing an unrequested view of an item may cause the person 650 to become interested. Furthermore, the display module 240 may include a synthetic background image that may further increase the attractiveness of the item. As previously described, the display module 240 may provide a user interface in response to the person 650 stopping at the display 610. Furthermore, the transaction module 320 may provide purchase options for the user.

As previously described, the display module 240 may present a live real-time video of the person 630 wearing the selected item 640 with an overlaid image of the selected item. In this way, a person may envision themselves wearing the selected item 640.

Figure 7:
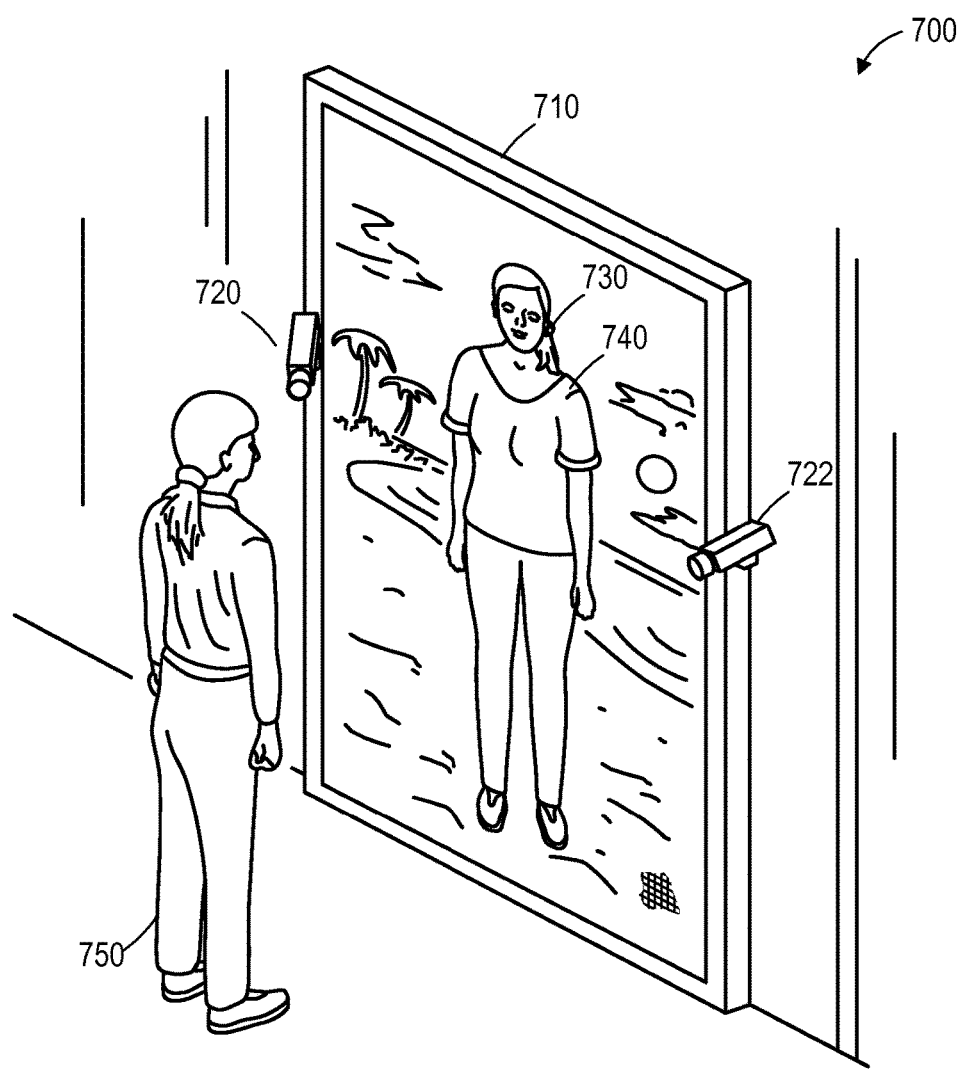
FIG. 7 is a block diagram illustrating a system, in accordance with another example embodiment, providing a virtual shopping environment.

FIG. 7 is an illustration depicting components of a device suitable for providing a virtual item shopping environment in accordance with embodiments of the present disclosure. In one embodiment, the device may include a display 710, a first camera 720, a second camera 722, and a computing device substantially embodying one or more functions of modules described herein. The display 710 and the cameras 720,722 may or may not be substantially similar to those depicted in earlier figures.

As previously described, the dimension module 210 may determine one or more dimensions of a person 750 near the display 710. In response to the person 750 selecting an item to virtually try-on, the display module 240 may depict a live real-time video of the person 750 wearing the selected item 740. Furthermore, the display module 240 may depict an artificial background that may enhance the person's perception of the selected item.

In another embodiment, the display module 240 may present a selection for the user to select a pre-configured background image. In certain examples, the background image may include a landscape scene, a ballroom, a dance hall, a party, other social gathering, or the like. In one embodiment, the display module 240 may present a live background that may include motion. For example, the display module 240 may present an ocean scene with moving waves and corresponding audio of the waves to enhance the experience of the user 750.

Figure 8:
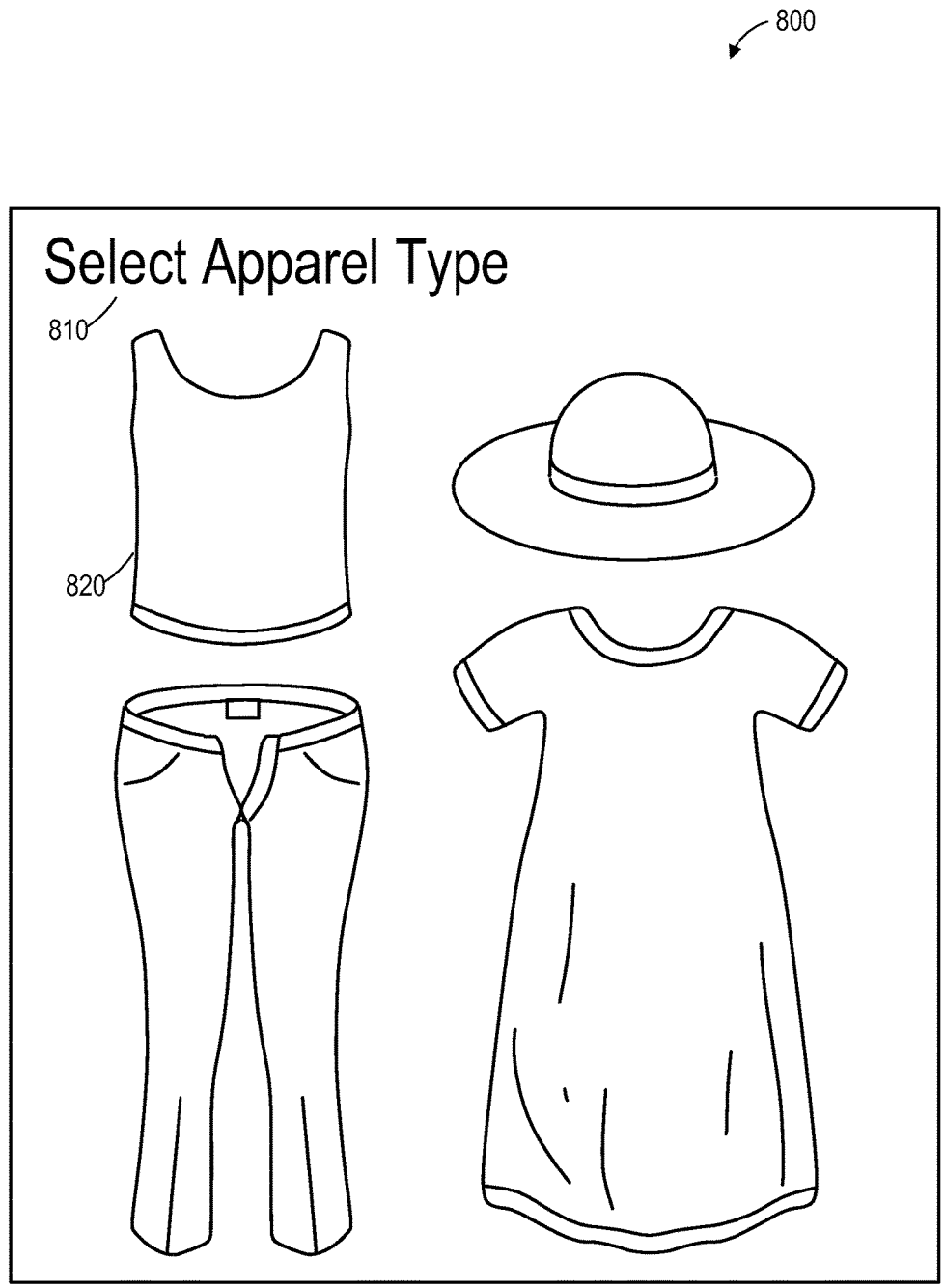
FIG. 8-10 are illustrations depicting various examples of a user interface in accordance with example embodiments.

FIG. 8 illustrates one examples of a user interface in accordance with certain embodiments of the present disclosure. In one embodiment, the display module 240 may present a set of item types for selection by the person. The display module 240 may present information 810 to the person to indicate an expected response. In response to the person selecting one of the item types, the display module 240 may present one or more items of the selected type as depicted in subsequent figures.

Figure 9:
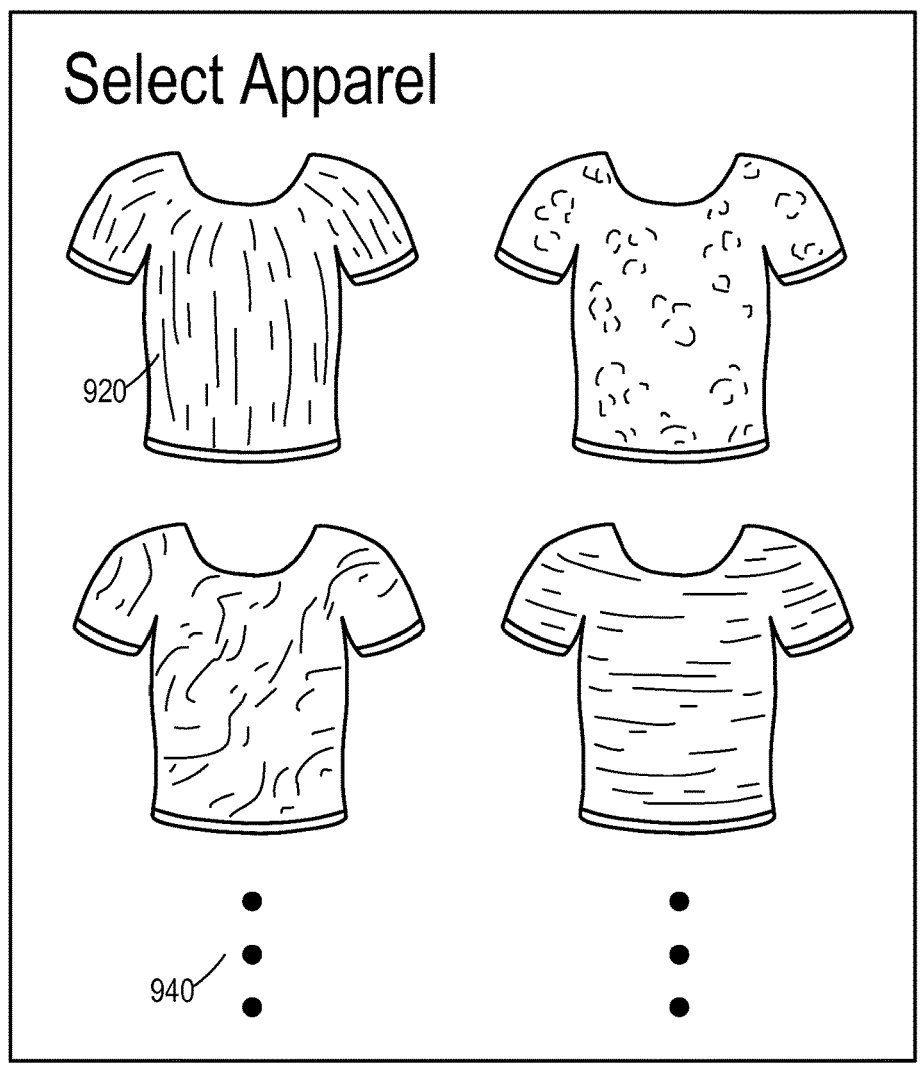

FIG. 9 illustrates one examples of a user interface in accordance with certain embodiments of the present disclosure. In one embodiment, the display module 240 may present one or more items available for purchase. In one example, in response to the user selecting a shirt, the selection module 220 may select one or more shirts from a remote database 115 that may fit the person making the selection. The display module 240 may display the selected shirts on the display. In one embodiment, the displayed shirts may include different patterns, colors, or other. For example, shirt 920 may have a different pattern than other selected shirts. Furthermore, the display module 240 may display a user control 940 that may indicate to the user that additional shirt may be viewed by scrolling downwards. In other examples, the control 940 may include a down arrow, or other indication.

In one example, the display module 240 may communicate with a touch sensor to receive input from the user via a touch. In another example, the display module 240 may communicate with a gesture sensor to receive input from the user via a gesture. In another example, the display module 240 may communicate with a mobile device of the user to receive selections from the user. An application executing on a user's mobile device may transmit selections or input from the user to the display module 240. One skilled in the art may appreciate other ways in which input from a user may be transmitted to the display module 240 and this disclosure is meant to include all such ways.

Figure 10:
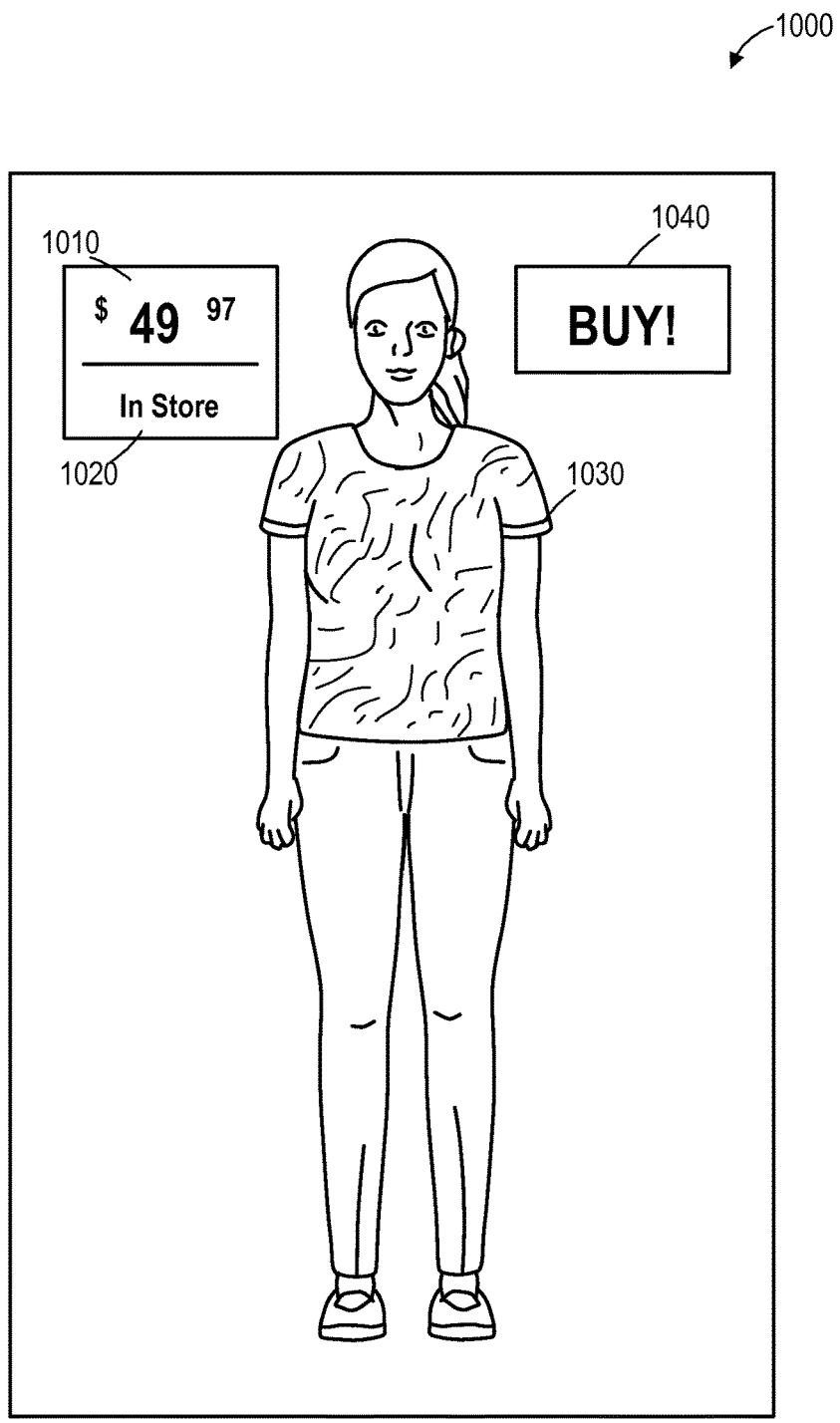

FIG. 10 illustrates one examples of a user interface in accordance with certain embodiments of the present disclosure. In one embodiment, the display module 240 may present a live real-time video of a person wearing a virtual item as previously described. In addition to the live real-time video of the person with an overlaid view of the item, the display module 240 may present additional information.

In one example, the display module 240 may display a price 1010 for the selected item. In another example, the display module 240 may display availability for the selected item. For example, the display module 240 may indicate that the selected item is available in the store, available online, not currently available, out of stock, or other, or the like as one skilled in the art may appreciate.

In another example, the display module 240 may display a user option for the user to purchase the selected item. In one example, in response to the user viewing the selected item for a threshold amount of time, the display module 240 may present a button for the user to press to purchase the selected item. In response, the transaction module 320 may request, if needed, financial information from the person in order to request funds from a financial entity for the person. In another example, the transaction module 320 may receive financial information from a mobile device associated with the user as one skilled in the art may appreciate. In another example, the transaction module 320 may request the mobile device to perform a financial transaction.

Figure 11:
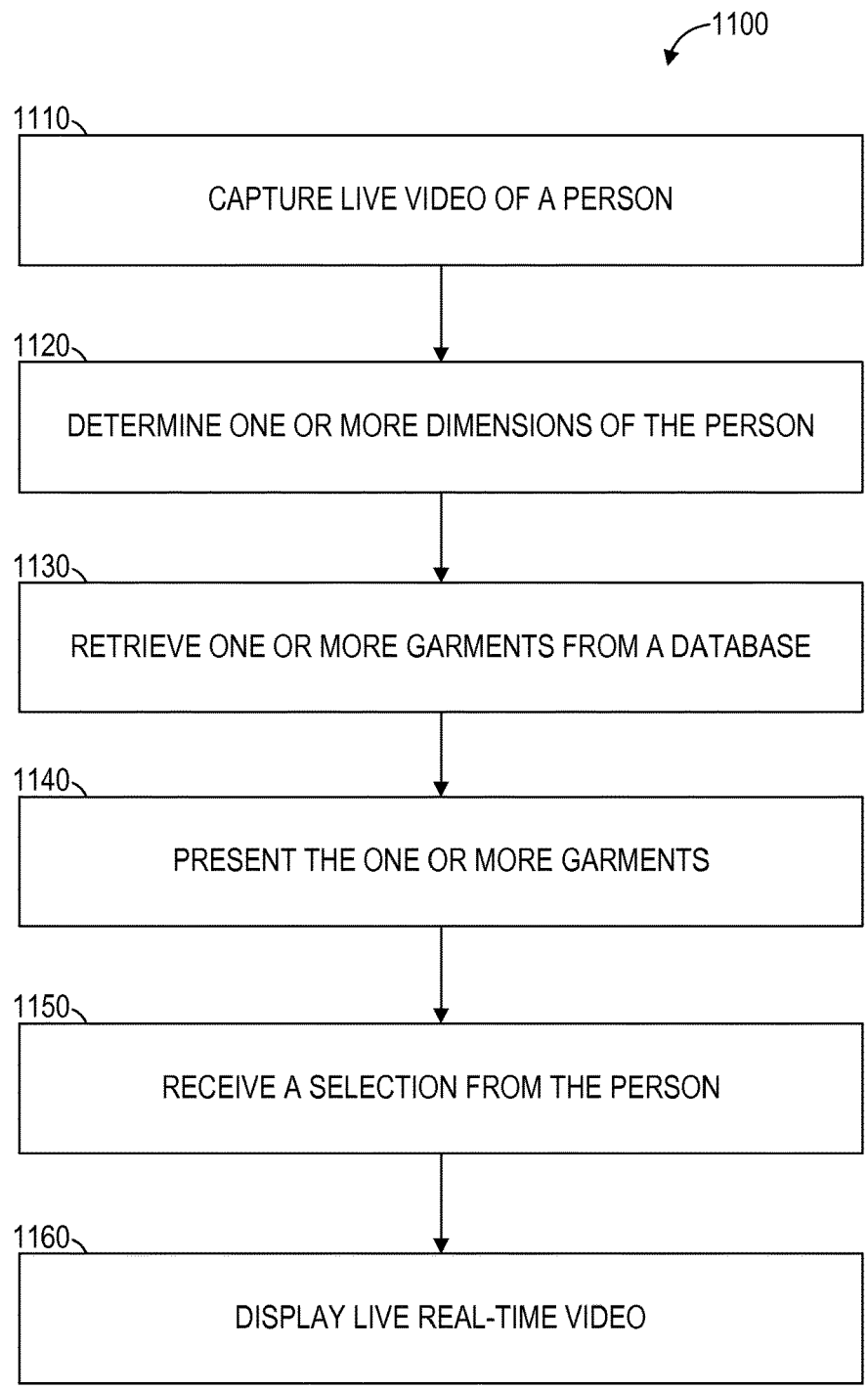
FIG. 11 is a flow diagram illustrating a method in accordance with an example embodiment.

FIG. 11 is a flowchart illustrating operations of a machine performing a method 1100 according to certain embodiments of the present disclosure. Operations in the method 1100 may be performed by the device 110, using modules described above with respect to FIGS. 2 and 3. As shown in FIG. 11, the method 1100 includes operations 1110, 1120, 1130, 1140, 1150, and 1160.

In one embodiment, the method 1100 may begin and at operation 1100 a dimension module 210 may receive, from a camera 112, live video of a person near a display 114. The determination module 210 may then determine at operation 1120 one or more dimensions of the person based on the live video. The selection module 220 may then retrieve at operation 1130 one or more items from a database based on the determined dimensions. The display module 240 may then present at operation 1140 the one or more items on the display 114. The selection module 220 may then receive at operation 1150 a selection from the person via a user interface, the selection indicating one of the presented items.

The display module 240 may then display at operation 1160 a live real-time video of the person wearing the selected item. In another example embodiment, the live real-time video may include video of the person and an overlaid image of the selected item.

Figure 12:
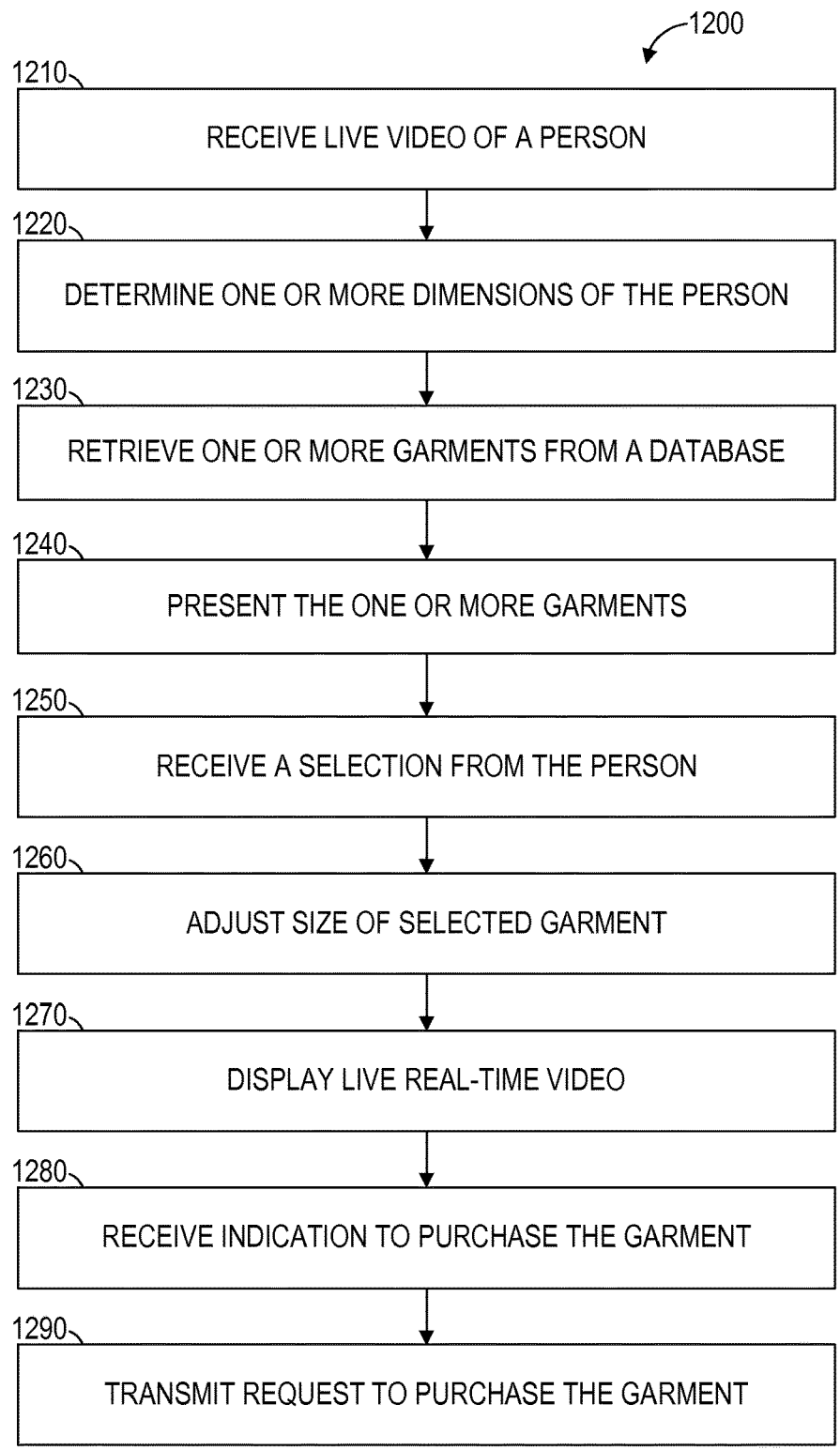
FIG. 12 is a flow diagram illustrating a method in accordance with another example embodiment.

FIG. 12 is a flowchart illustrating operations of a machine performing a method 1200 according to certain embodiments of the present disclosure. Operations in the method 1200 may be performed by the device 110, using modules described above with respect to FIGS. 2 and 3. As shown in FIG. 12, the method 1200 includes operations 1210, 1220, 1230, 1240, 1250, 1260, 1270, 1280, and 1290.

In one embodiment, the method 1200 may begin and the dimension module 210 may receive at operation 1210 live video of a person from a camera 112. The dimension module 210 may determine at operation 1220 one or more dimensions of the person based, at least in part, on the captured video. The selection module 220 may retrieve at operation 1230 one or more items from a remote database 115. The display module 240 may present at operation 1240 the one or more items via a display. The selection module 220 may receive at operation 1250 a selection of one of the items. The dimension module 210 may adjust at operation 1260 a size of the selected item based, at least in part, on the brand of the selected item and information regarding the size of the selected items. The display module 240 may display live real-time video of the person wearing the selected item. In one embodiment, the display module 240 may display at operation 1270 live real-time video of the person and overlay a model of the selected item. The transaction module 320 may receive at operation 1280 an indication from the person to purchase the selected item. The transaction module 320 may transmit at operation 1290 a request to purchase the item to a financial institution.

In another embodiment of the method 1200, the dimension module 210 may determine one or more dimensions using data from the camera and a pre-determined point of reference. In another embodiment of the method 1200, the dimension module 210 may determine one or more dimensions of the person using data from two or more cameras. Dimensions of the person may include height, weight, width, body curvature, or the like. In another embodiment of the method 1200, the live real-time video may include a full body representation of the person. In a further embodiment, the live real-time video may further include a simulated background as described herein.

In another embodiment, the selection module 220 may select one or more items are selected from an inventory of items at a physical location within proximity of the display. Therefore, in certain embodiments, items depicted may be limited to items available at an associated retail outlet, or other, or the like.

Figure 13:
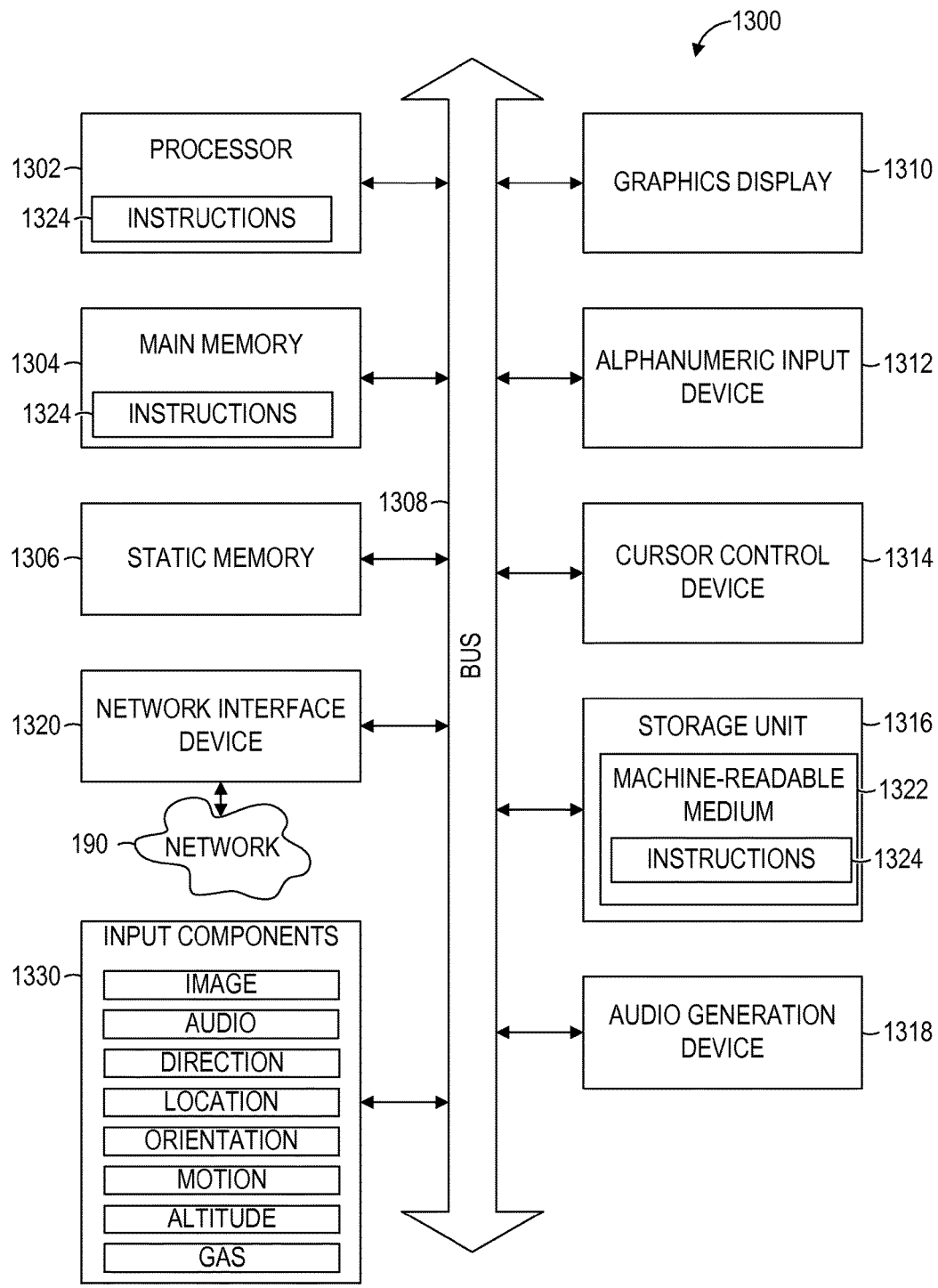
FIG. 13 is a block diagram illustrating components of a machine, according to some example embodiments, able to read instructions from a machine-readable medium and perform any one or more of the methodologies discussed herein.

FIG. 13 is a block diagram illustrating components of a machine 1300, according to some example embodiments, able to read instructions 1324 from a machine-readable medium 1322 (e.g., a non-transitory machine-readable medium, a machine-readable storage medium, a computer-readable storage medium, or any suitable combination thereof) and perform any one or more of the methodologies discussed herein, in whole or in part. Specifically, FIG. 13 shows the machine 1300 in the example form of a computer system (e.g., a computer) within which the instructions 1324 (e.g., software, a program, an application, an applet, an app, or other executable code) for causing the machine 1300 to perform any one or more of the methodologies discussed herein may be executed, in whole or in part.

In alternative embodiments, the machine 1300 may operate as a standalone device or may be connected (e.g., networked) to other machines. In a networked deployment, the machine 1300 may operate in the capacity of a server machine or a client machine in a server-client network environment, or as a peer machine in a distributed (e.g., peer-to-peer) network environment. The machine 1300 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1324 to perform all or part of any one or more of the methodologies discussed herein.

The machine 1300 includes a processor 1302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1304, and a static memory 1306, which are configured to communicate with each other via a bus 1308. The processor 1302 may contain microcircuits that are configurable, temporarily or permanently, by some or all of the instructions 1324 such that the processor 1302 is configurable to perform any one or more of the methodologies described herein, in whole or in part. For example, a set of one or more microcircuits of the processor 1302 may be configurable to execute one or more modules (e.g., software modules) described herein.

The machine 1300 may further include a graphics display 1310 (e.g., a plasma display panel (PDP), a light emitting diode (LED) display, a liquid crystal display (LCD), a projector, a cathode ray tube (CRT), or any other display capable of displaying graphics or video). The machine 1300 may also include an alphanumeric input device 1312 (e.g., a keyboard or keypad), a cursor control device 1314 (e.g., a mouse, a touchpad, a trackball, a joystick, a motion sensor, an eye tracking device, or other pointing instrument), a storage unit 1316, an audio generation device 1318 (e.g., a sound card, an amplifier, a speaker, a headphone jack, or any suitable combination thereof), and a network interface device 1320.

The storage unit 1316 includes the machine-readable medium 1322 (e.g., a tangible and non-transitory machine-readable storage medium) on which are stored the instructions 1324 embodying any one or more of the methodologies or functions described herein. The instructions 1324 may also reside, completely or at least partially, within the main memory 1304, within the processor 1302 (e.g., within the processor's cache memory), or both, before or during execution thereof by the machine 1300. Accordingly, the main memory 1304 and the processor 1302 may be considered machine-readable media (e.g., tangible and non-transitory machine-readable media). The instructions 1324 may be transmitted or received over the network 190 via the network interface device 1320. For example, the network interface device 1320 may communicate the instructions 1324 using any one or more transfer protocols (e.g., hypertext transfer protocol (HTTP)).

In some example embodiments, the machine 1300 may be a portable computing device, such as a smart phone or tablet computer, and have one or more additional input components 1330 (e.g., sensors or gauges). Examples of such input components 1330 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Figure 14:
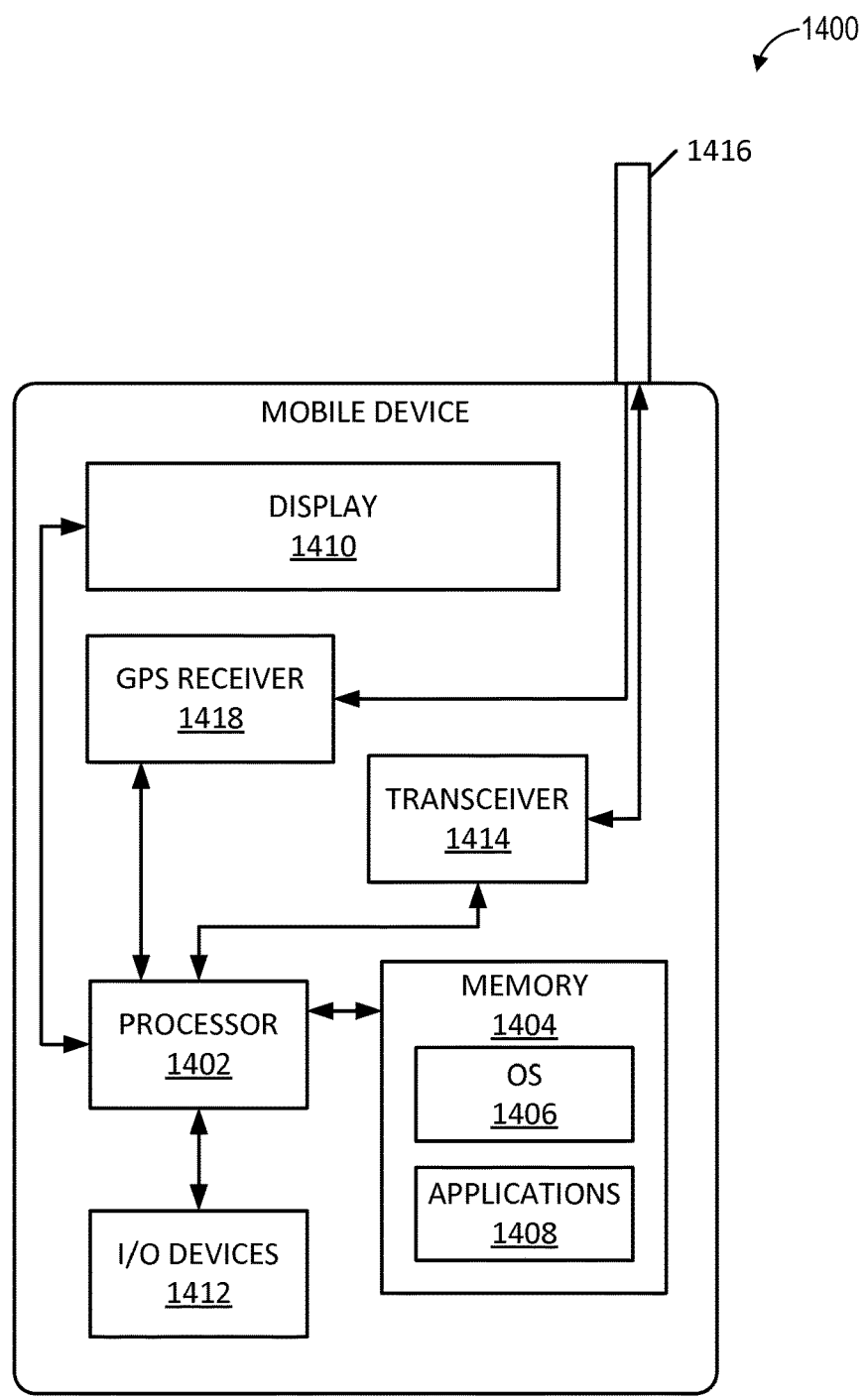
FIG. 14 is a block diagram illustrating components of a mobile device, according to some example embodiments.

FIG. 14 is a block diagram illustrating a mobile device 1400, according to an example embodiment. The mobile device 1400 may include a processor 1402. The processor 1402 may be any of a variety of different types of commercially available processors suitable for mobile devices (for example, an XScale architecture microprocessor, a microprocessor without interlocked pipeline stages (MIPS) architecture processor, or another type of processor 1402). A memory 1404, such as a random access memory (RAM), a flash memory, or other type of memory, is typically accessible to the processor 1402. The memory 1404 may be adapted to store an operating system (OS) 1406, as well as applications 1408, such as a mobile location-enabled application that may provide location-based services (LBSs) to a user. The processor 1402 may be coupled, either directly or via appropriate intermediary hardware, to a display 1410 and to one or more input/output (I/O) devices 1412, such as a keypad, a touch panel sensor, a microphone, and the like. Similarly, in some embodiments, the processor 1402 may be coupled to a transceiver 1414 that interfaces with an antenna 1416. The transceiver 1414 may be configured to both transmit and receive cellular network signals, wireless data signals, or other types of signals via the antenna 1416, depending on the nature of the mobile device 1400. Further, in some configurations, a GPS receiver 1418 may also make use of the antenna 1416 to receive GPS signals.

In one embodiment, the system 105 may be embodied in a mobile device as described herein. In one example, a mobile device may include a camera 112, a display 114, the dimension module 210, the selection module 220, and the display module 240. In one example, a consumer may hold the mobile device in a position such that the camera 112 may capture live video of the consumer. In another embodiment, the mobile device may include two cameras in communication with the dimension module 210 in order to determine one or more dimensions of the user. In another embodiment, the mobile device may include a laser or other detection device for determining a distance between the user and the camera. Based on a distance between the user and the camera, the dimension module 220 may determine one or more dimensions.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1322 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1324 for execution by the machine 1300, such that the instructions 1324, when executed by one or more processors of the machine 1300 (e.g., processor 1302), cause the machine 1300 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non exclusive "or," unless specifically stated otherwise.

What is claimed is:

1. A system comprising:
a display;
a camera configured to capture live video of a person walking past the display;
a non-transitory computer storage medium containing a plurality of software modules which, when executed by one or more processors, operate one or more software modules, including:
a dimension module configured to determine one or more dimensions of the person walking past the display based on the live video;
a selection module configured to select one or more items from a database based on the determined dimensions and to receive one or more data records representing the one or more respective items from the database, wherein the selection module is configured to automatically determine an item available for sale and select the item without intervention from said person; and
a display module configured to present the one or more items on the display, based on the one or more data records representing the one or more respective items from the database, the display module being further configured to present live real-time video of the person walking past the display with an overlaid view of the item available for sale to provide an unrequested view of the item available for sale;
the selection module further configured to receive a selection from the person via a user interface, the selection indicating one of the presented items.

2. The system of claim 1, further comprising a transaction module configured to receive an indication from the person to purchase the selected item, the transaction module further configured to transmit a request to purchase the indicated item to a financial entity.

3. The system of claim 1, wherein the display module is further configured to render the overlaid view of the selected item based on tension or force in the item draped on a body and how the item flows as the body performs actions matching actions performed by the person in the live real-time video.

4. The system of claim 1, wherein the dimensions comprise height and weight of the person.

5. The system of claim 1, wherein the dimension module is further configured to adjust a size of the selected item based on a brand of the selected item and information about dimensions of the size for the brand.

6. The system of claim 1, wherein the live real-time video further comprises a simulated background.

7. The system of claim 1, wherein the one or more items are selected from an inventory of items available at a physical location within proximity of the display.

8. The system of claim 1, wherein the dimension module is further configured to determine the one or more dimensions of the person based on the live video, based on the known distance, and based on clothing worn by the person.

9. A method comprising:
capturing, using a camera, live video of a person walking past a display;
determining one or more dimensions of the person walking past the display based on the live video;
selecting one or more items from a database based on the determined dimensions, said selecting comprising automatically determining an item available for sale and selecting the item without intervention from said person;
retrieving one or more data records representing one or more respective items from a database based on the determined dimension;
presenting the one or more items on a display based on the one or more data records representing the one or more respective items, said presenting comprising presenting live real-time video of the person walking past the display with an overlaid view of the item available for sale to provide an unrequested view of the item available for sale;
receiving a selection from the person via a user interface, the selection indicating one of the presented items.

10. The method of claim 9, further comprising:
receiving an indication to purchase the selected item; and
transmitting a request to purchase the selected item to a financial entity.

11. The method of claim 9, wherein the displaying further comprises rendering the overlaid view of the selected item based on tension or force in the item draped on a body and how the item flows as the body performs actions matching actions performed by the person in the live real-time video.

12. The method of claim 9, wherein the determining comprises determining a dimension of the person using data from two or more cameras.

13. The method of claim 9, further comprising adjusting a size of the selected item based on a brand of the selected item and information about dimensions of the size for the brand.

14. The method of claim 9, wherein the live real-time video comprises a full body view of the person wearing the selected item.

15. The method of claim 9, wherein the live real-time video further comprises a simulated background.

16. The method of claim 9, wherein the one or more items are selected from an inventory of items at a physical location within proximity of the display.

17. A non-transitory machine-readable storage medium comprising instructions, which when implemented by one or more machines, cause the one or more machines to perform operations comprising:

- capturing, using a camera, live video of a person walking past a display;
- determining one or more dimensions of the person based on the live video of the person walking past the display;
- selecting one or more items from a database based on the determined dimensions, said selecting comprising automatically determining an item available for sale and selecting the item without intervention from said person;
- retrieving one or more data records representing one or more respective items from a database based on the determined dimension;
- presenting the one or more items on a display based on the one or more records representing the one or more respective items from the database, said presenting comprising presenting live real-time video of the person walking past the display with an overlaid view of the item available for sale to provide an unrequested view of the item available for sale;
- receiving a selection from the person via a user interface, the selection indicating one of the presented items.

18. The non-transitory machine-readable storage medium of claim 17, wherein the operations further comprise receiving an indication to purchase the selected item and transmitting a request to purchase the selected item to a financial entity.

19. The non-transitory machine-readable storage medium of claim 17, wherein the displaying further comprises rendering the overlaid view of the selected item based on tension or force in the item draped on a body and how the item flows as the body performs actions matching actions performed by the person in the live real-time video.

20. The non-transitory machine-readable storage medium of claim 17, wherein the determining comprises measuring a dimension of the person using data from two or more cameras.

21. The non-transitory machine-readable storage medium of claim 17, wherein the operations further comprise adjusting a size of the selected item based on a brand of the selected item and information about dimensions of the size for the brand.

22. The non-transitory machine-readable storage medium of claim 17, wherein the live real-time video comprises a full body view of the person wearing the selected item.

23. The non-transitory machine-readable storage medium of claim 17, wherein the live real-time video further comprises a simulated background.

24. The non-transitory machine-readable storage medium of claim 17, wherein the one or more items are selected from an inventory of items at a physical location within proximity of the display.

* * * * *